United States Patent
Kashiyama

(10) Patent No.: US 8,480,240 B2
(45) Date of Patent: Jul. 9, 2013

(54) IMAGE CAPTURING APPARATUS

(75) Inventor: Ritsuo Kashiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/399,055

(22) Filed: Feb. 17, 2012

(65) Prior Publication Data

US 2012/0182457 A1    Jul. 19, 2012

Related U.S. Application Data

(62) Division of application No. 12/030,510, filed on Feb. 13, 2008, now Pat. No. 8,136,952.

(30) Foreign Application Priority Data

Feb. 20, 2007  (JP) ................................ 2007-039830
May 29, 2007  (JP) ................................ 2007-142330

(51) Int. Cl.
  *B60R 1/00*   (2006.01)
  *H01L 41/00*  (2006.01)

(52) U.S. Cl.
  USPC ........... 359/507; 310/311; 310/314; 310/318; 348/340

(58) Field of Classification Search
  USPC .............. 359/507; 310/311, 314, 316.01, 310/317, 318, 328; 348/294, 335, 340, 342, 348/360, 374
  See application file for complete search history.

(56) References Cited

U.S. PATENT DOCUMENTS

| | | | |
|---|---|---|---|
| 7,006,138 B2* | 2/2006 | Kawai | 348/340 |
| 7,645,079 B2* | 1/2010 | Inukai et al. | 396/529 |
| 7,719,600 B2* | 5/2010 | Kaihara et al. | 348/335 |
| 7,778,542 B2* | 8/2010 | Oshima | 396/236 |
| 8,136,952 B2* | 3/2012 | Kashiyama | 359/507 |
| 2003/0202114 A1* | 10/2003 | Takizawa et al. | 348/335 |
| 2004/0047625 A1* | 3/2004 | Ito et al. | 396/429 |

\* cited by examiner

*Primary Examiner* — Ricky D Shafer
(74) *Attorney, Agent, or Firm* — Cowan, Liebowitz & Latman, P.C.

(57) ABSTRACT

An image capturing apparatus with an image sensor converting the image of a subject and an optical member in front of the image sensor. First and second piezoelectric elements at respective ends of the optical member are independently driven by respective first and second driving units. A detection unit has first and second detecting piezoelectric elements adjacent to the respective first and second piezoelectric elements for detecting vibration of the optical member. A first control unit controls the first and second driving units and the detection unit to vibrate the optical member by vibrating the first piezoelectric element and detect vibration of the optical member using the second detecting piezoelectric element, or vibrate the optical member by vibrating the second piezoelectric element and detect vibration of the optical member using the first detecting piezoelectric element.

8 Claims, 22 Drawing Sheets

F I G. 11
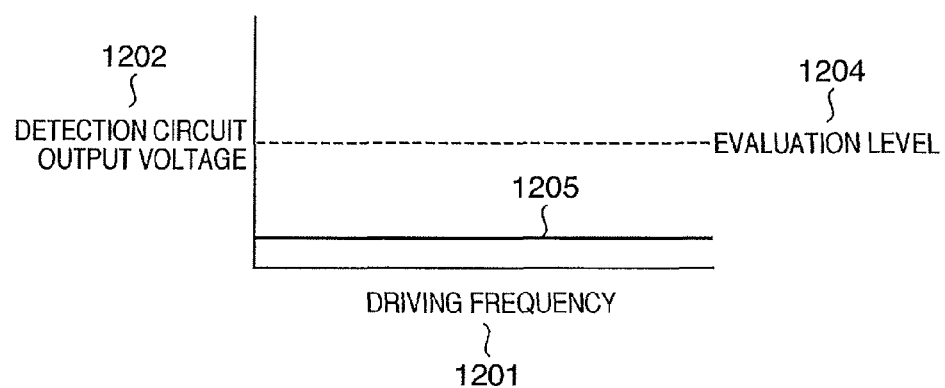

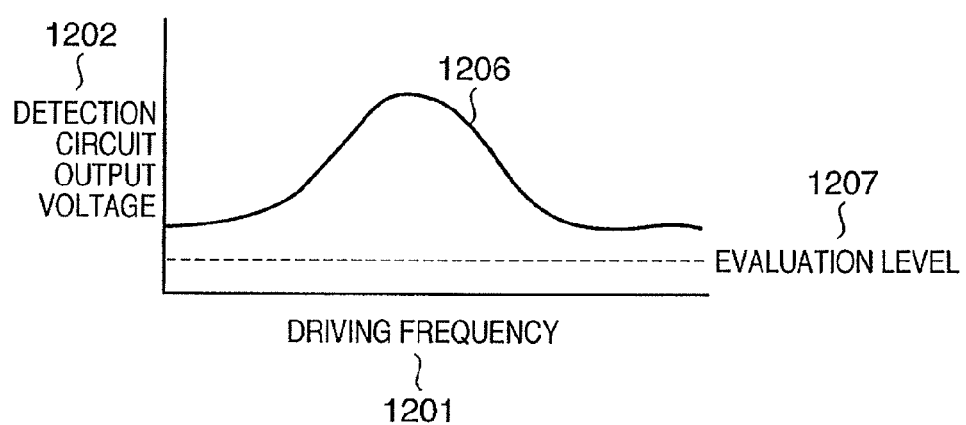
F I G. 12

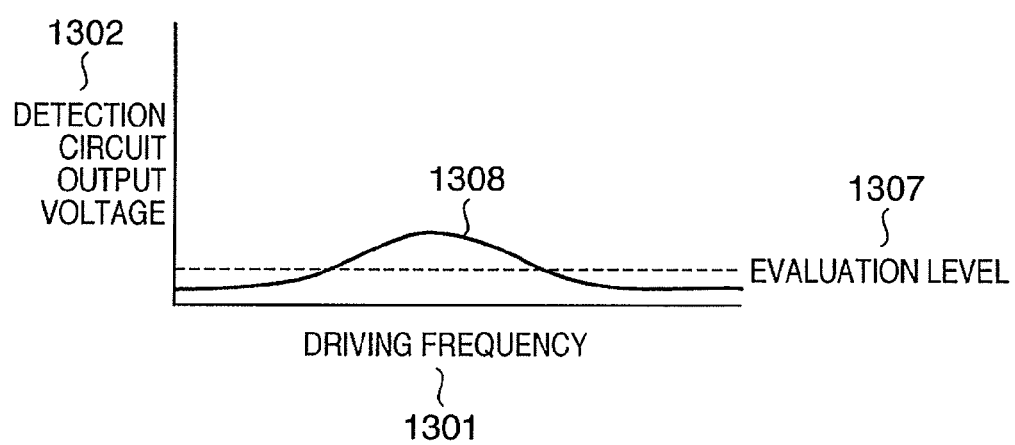
F I G. 17

IMAGE CAPTURING APPARATUS

CROSS-REFERENCE TO RELATED APPLICATION

This application is a divisional of application Ser. No. 12/030,510, filed Feb. 13, 2008, now U.S. Pat. No. 8,136,952, the entire disclosure of which is hereby incorporated by reference.

BACKGROUND OF THE INVENTION

1. Field of the Invention

The present invention relates to a technique for removing a foreign substance that has attached itself to the surface of an optical element placed in front of an image sensor in an image capturing apparatus such as a digital camera.

2. Description of the Related Art

Many types of electronic image capturing apparatus (referred to simply as a "camera" below) typified by a digital still camera or video camera have become widespread rapidly owing to their immediacy and high affinity for personal computers. Such cameras obtain image data by opto-electronically converting the image of a subject using an image sensor and comprise generally small components such as the image sensor, a shooting optical system and an optical element such as a low-pass filter placed in front of the image sensor.

If a foreign substance such as dust attaches itself to, say, the optical element in the camera, the foreign substance itself appears in the image and causes a decline in the quality of the image. For this reason, various techniques for removing an adhering foreign substance by vibrating the optical element have been proposed and have started to be put into practice in recent years (see the specification of Japanese Patent Application Laid-Open No. 2003-333391).

In a case where an adhering foreign substance is removed by vibrating an optical element as described above, a vibrating device using a piezoelectric element generally is employed as the device that vibrates the optical element. For example, in a case where the vibrating device using a piezoelectric element malfunctions for some reason, there is the possibility that the vibration applied to the optical element will become too large and that this will destroy the optical element.

If the optical element is destroyed, it will be necessary to check the image by performing a shooting operation in order to detect such destruction. The problem which arises is that unnecessary labor is imposed upon the user.

SUMMARY OF THE INVENTION

The present invention has been devised in view of the above-described circumstances and seeks to so arrange it that detection of an abnormality in a vibrating device that employs a piezoelectric element can be readily achieved with a simple arrangement.

According to a first aspect of the present invention, the foregoing object is attained by providing an image capturing apparatus comprising: an image sensor adapted to opto-electronically convert the image of a subject; an optical member placed in front of the image sensor; first and second piezoelectric elements placed at respective ones of both ends of the optical member; first and second driving units adapted to independently vibrate the first and second piezoelectric elements, respectively; a detection unit having first and second detecting piezoelectric elements placed adjacent to the first and second piezoelectric elements, respectively, for detecting vibration of the optical member; and a first control unit adapted to control the first and second driving units and the detection unit so as to vibrate the optical member by vibrating the first piezoelectric element and detect vibration of the optical member using the second detecting piezoelectric element, or vibrate the optical member by vibrating the second piezoelectric element and detect vibration of the optical member using the first detecting piezoelectric element.

According to a second aspect of the present invention, the foregoing object is attained by providing an image capturing apparatus comprising: an image sensor adapted to opto-electronically convert the image of a subject; an optical member placed in front of the image sensor; first and second piezoelectric elements placed at respective ones of both ends of the optical member; first and second driving units adapted to independently vibrate the first and second piezoelectric elements, respectively; a first detection unit connected between the first piezoelectric element and the first driving unit and adapted to detect an output signal that is output from the first piezoelectric element owing to vibration of the first piezoelectric element; a second detection unit connected between the second piezoelectric element and the second driving unit and adapted to detect an output signal that is output from the second piezoelectric element owing to vibration of the second piezoelectric element; and a first control unit adapted to vibrate the optical member by vibrating the first piezoelectric element and detect the output signal, which is output from the second piezoelectric element, using the second detection unit, or vibrate the optical member by vibrating the second piezoelectric element and detect the output signal, which is output from the first piezoelectric element, using the first detection unit.

Further features of the present invention will become apparent from the following description of exemplary embodiments with reference to the attached drawings.

BRIEF DESCRIPTION OF THE DRAWINGS

FIG. 11 is a diagram illustrating the output of a detection circuit in a case where a driving circuit has developed an abnormality;

FIG. 12 is a diagram illustrating a detection signal when a driving circuit on one side is actuated and the vibrating state of an optical member is detected by a detecting piezoelectric element and detection circuit on the opposite side;

FIG. 17 is a diagram illustrating an example of an abnormal signal;

DESCRIPTION OF THE EMBODIMENTS

A single-lens reflex digital camera equipped with a vibrating device using piezoelectric elements according to embodiments of the present invention will be described in detail with reference to the drawings.

First Embodiment

Figure 1:
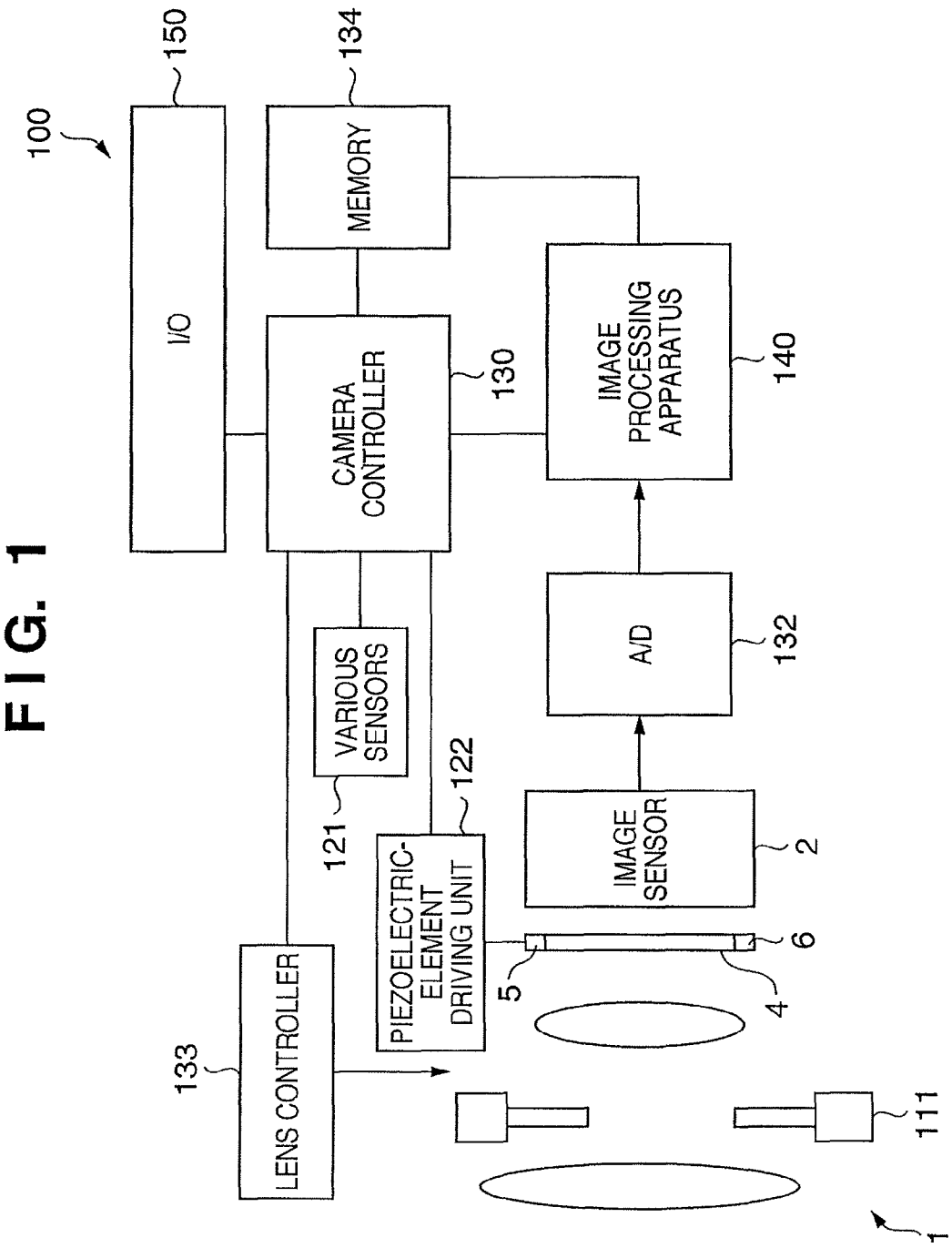
FIG. 1 is a block diagram of a single-lens reflex digital camera according to a first embodiment of the present invention.

FIG. 1 is a block diagram of a single-lens reflex digital camera according to a first embodiment of the present invention.

In FIG. 1, an interchangeable shooting lens unit 1 forms the image of a subject. An aperture stop 111 for adjusting the amount of light that impinges upon an image sensor 2 is provided in the shooting lens unit 1. The image sensor 2 opto-electronically converts the image of the subject. An optical member 4 that functions also as a dust-proof filter referred to as a low-pass filter or cover filter is placed in front of the image sensor 2 in close proximity thereto. A foreign substance may attach itself to the surface of the optical member 4. The adhering foreign substance shows up as a shadow in the image of the subject on the image sensor 2. Piezoelectric elements 5 and 6 for vibrating the optical member 4 to thereby remove the adhering foreign substance are placed respectively at the left and right of the optical member 4 (indicated at positions above and below the optical member 4 in FIG. 1 for the sake of convenience). A piezoelectric-element driving unit 122 for vibrating the piezoelectric elements 5 and 6 independently are connected to the piezoelectric elements 5 and 6.

An A/D converter 132 converts an analog image signal, which is output from the image sensor 2, to a digital signal. An image processing apparatus 140 processes the digital image signal that is output from the A/D converter 132. A lens controller 133 controls lens position and the degree to which the aperture stop in the shooting lens unit 1 opens. Various sensors 121, such as AF (auto focus) sensor and AE (auto exposure) sensor, are provided. A camera controller 130 controls the overall operation of the digital camera. Also provided are an I/O unit 150 such as a shutter button, display and shooting-mode selection dial, and a memory 134 for storing shot images and various information.

An operation performed by the user is acquired via the I/O unit 150. Operations that can be performed by the user include power source ON/OFF and a shooting operation, etc. If the shooting operation has been designated, the camera controller 130 decides appropriate shooting conditions based upon information obtained from the various sensors 121 and image sensor 2, and sets an appropriate lens position, etc., via the lens controller 133. After the output signal from the image sensor 2 is digitally converted via the A/D converter 132 following exposure, the digital signal is subjected to appropriate image processing by the image processing apparatus 140 and the processed signal is stored in the memory 134. If necessary, the image is displayed on a display unit (not shown) via the I/O unit 150.

The image processing apparatus 140 executes processing such as a white balance adjustment, RGB development and compressive encoding.

Figure 2:
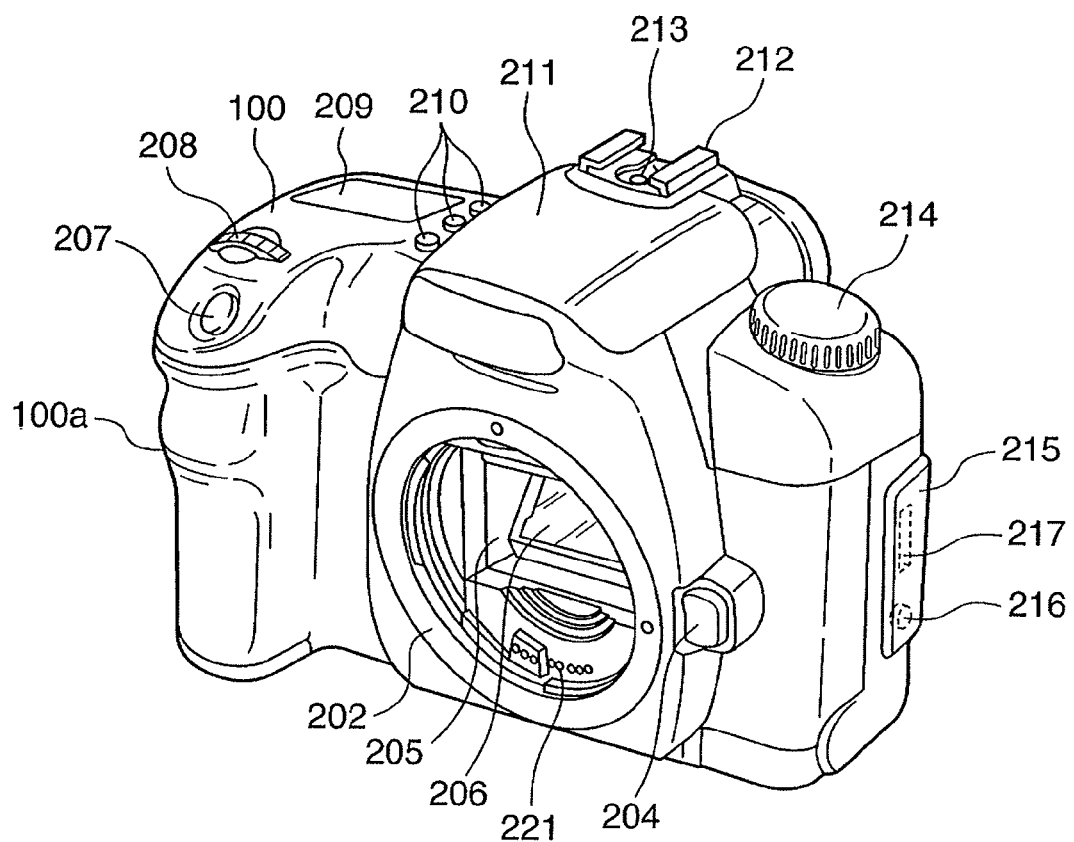
FIG. 2 is a diagram illustrating the external appearance of the single-lens reflex digital camera of the first embodiment.

FIG. 2 is a diagram illustrating the external appearance of the single-lens reflex digital camera of the first embodiment. Specifically, FIG. 2 is a perspective view as seen from the front side of the camera and illustrates a state in which the shooting lens unit has been detached.

As shown in FIG. 2, the camera has a main body 100 provided with a grip portion 100a projecting toward the front in such a manner that the user may readily grasp the camera stably when a picture is taken. A mount portion 202 allows the detachable shooting lens unit 1 (see FIG. 1) to be fixed to the camera main body. Mount contacts 221 have a function for exchanging a control signal, status signal and data signal, etc., between the camera main body 100 and shooting lens unit 1, and for supplying power to the side of the shooting lens unit. Further, the mount contacts 221 may be adapted to enable optical communication and audio communication and not just electrical communication.

A lens unlock button 204 is pressed when the shooting lens unit 1 is detached. A mirror box 205 is placed inside the camera case. Light rays resulting from the shot are introduced into the mirror box 205 through the shooting lens. A quick-return mirror 206 is placed within the mirror box 205. The quick-return mirror 206 can take on two states, namely a state in which the quick-return mirror 206 is held at a 45° angle with respect to the shooting optic axis in order to guide the light rays in the direction of a pentagonal prism (not shown), and a state in which the quick-return mirror 206 is held at a position retracted from the light rays in order that the light rays are guided in the direction of the image sensor 2 (see FIG. 1).

A shutter button 207 serving as a start switch to begin shooting, a main operation dial 208 for setting shutter speed and f-stop value in accordance with the operating mode at the time of photography, and a shooting system operating-mode setting button 210 are placed on the grip side of the camera on the upper portion thereof. A portion of the results of the operation of these operating members is displayed on an LCD display panel 209. The I/O unit 150 shown in FIG. 1 mainly includes these operating members and the display panel, etc.

The shutter button 207 turns on a switch SW1 by being pressed through a first stroke (half way) and turns on a switch S2 by being pressed through a second stroke (all the way).

The operating-mode setting button 210 sets whether multiple frames are to be shot continuously or only one frame by a single depression of the shutter button 207, and sets a self-photography mode, etc. The state set is displayed on the LCD display panel 209.

A pop-up flash unit 211, flash-mounting shoe groove 212 and flash contact 213 are placed on the camera main body at the center of the top portion thereof. A shooting-mode setting dial 214 is placed on the upper portion of the camera near the right side thereof. The shooting-mode setting dial 214 serves also as a portion for starting an operation for removing a foreign substance such as dust, which has attached itself to the surface of the optical member 4, by vibrating the optical member 4 using the piezoelectric elements 5 and 6.

An openable and closable external terminal cover 215 is provided on the side surface of the camera opposite the grip side. A video-signal output jack 216 and a USB-output jack 217 serving as external interfaces are housed in the interior accessible by opening the external terminal cover 215.

Figure 3:
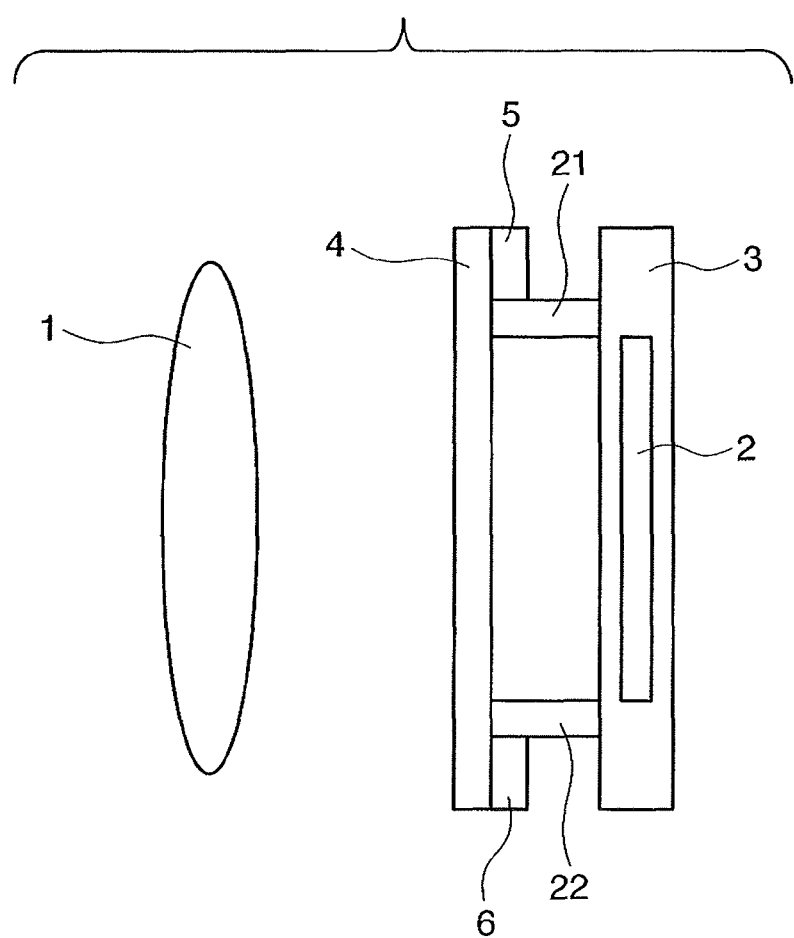
FIG. 3 is an enlarged view, as seen from above, of the vicinity of an image sensor shown in FIG. 1.

FIG. 3 is an enlarged view, as seen from above, of the vicinity of an image sensor shown in FIG. 1.

Shown in FIG. 3 are the shooting lens 1, the image sensor 2 for opto-electronically converting light that has entered from the shooting lens 1, and an image sensor package 3 for installing the image sensor 2 in the camera. The optical member 4, which is placed in front of the image sensor package 3, functions also as a dust-proof filter for preventing a foreign substance such as dust from attaching itself to the surface of the image sensor package 3 and to the image sensor 2. Specifically, the optical member 4 comprises an optical low-pass filter or infrared-blocking filter. The driving piezoelectric elements (first and second piezoelectric elements) 5 and 6 vibrate the optical member 4, and holding members 21 and 22 are for holding the optical member 4 in a hermetically sealed state with respect to the image sensor package 3. The details of the arrangement involving the holding members 21, 22 will be described later with reference to FIG. 19.

Figure 4:
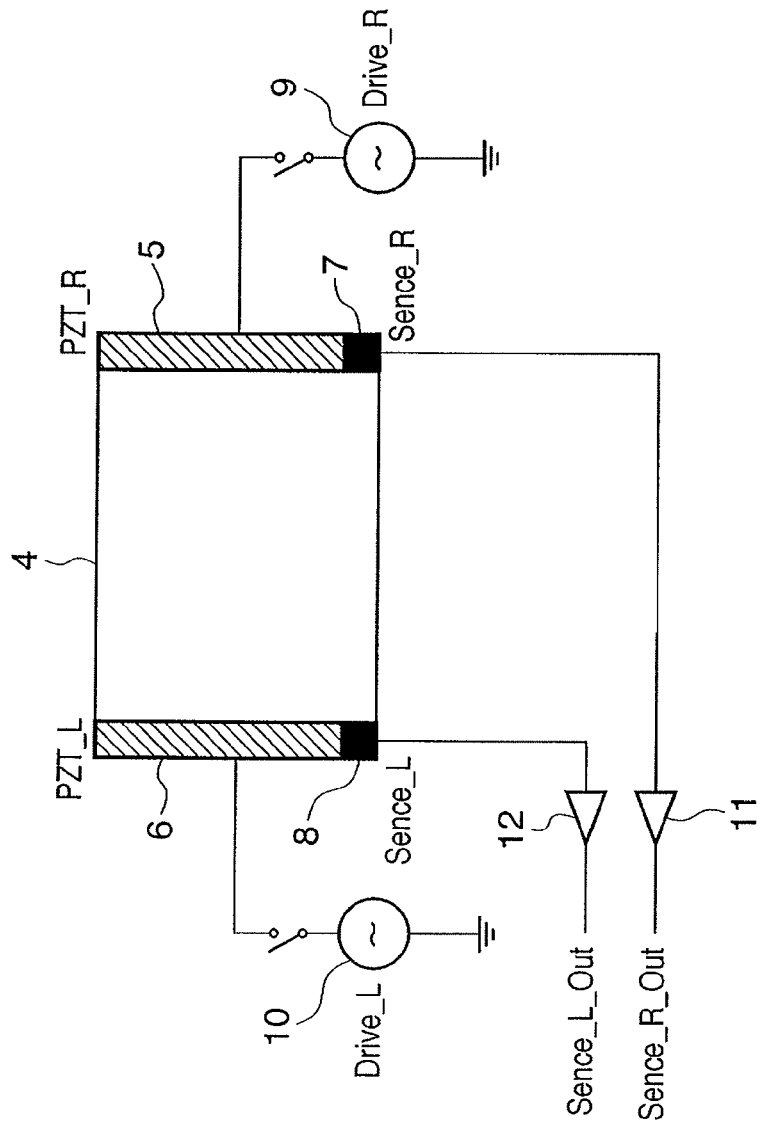
FIG. 4 is a diagram illustrating a portion of an optical member in FIG. 3 as seen from the side of the image sensor, as well as the peripheral circuits of piezoelectric elements.

FIG. 4 is a diagram illustrating a portion of the optical member 4 in FIG. 3 as seen from the side of the image sensor 2, as well as peripheral circuits of piezoelectric elements (namely circuitry within the piezoelectric-element driving unit 122 shown in FIG. 1).

As shown in FIG. 4, the piezoelectric elements (driving piezoelectric elements) 5 and 6 are affixed to respective ones of both ends of the optical member 4 so as to embrace the optical member 4 between them. Detecting piezoelectric elements (first and second detecting piezoelectric elements) 7 and 8 are placed adjacent to the piezoelectric elements 5 and 6, respectively, for detecting the state of vibration of the optical member 4.

A driving circuit (first driving means) 9 is for driving the piezoelectric element 5, and a driving circuit (second driving means) 10 is for driving the piezoelectric element 6. A detection circuit 11 is for detecting a signal from the detecting piezoelectric element 7, and a detection circuit 12 is for detecting a signal from the detecting piezoelectric element 8.

The piezoelectric elements 5 and 6 affixed to both ends of the optical member 4 are vibrated at a prescribed frequency, whereby the optical member 4 is vibrated due to the generation of standing waves and a foreign substance such as dust adhering to the surface of the optical member 4 is shaken off. The amplitude of vibration produced in the optical member 4 is detected by the detecting piezoelectric elements 7 and 8.

Figure 5:
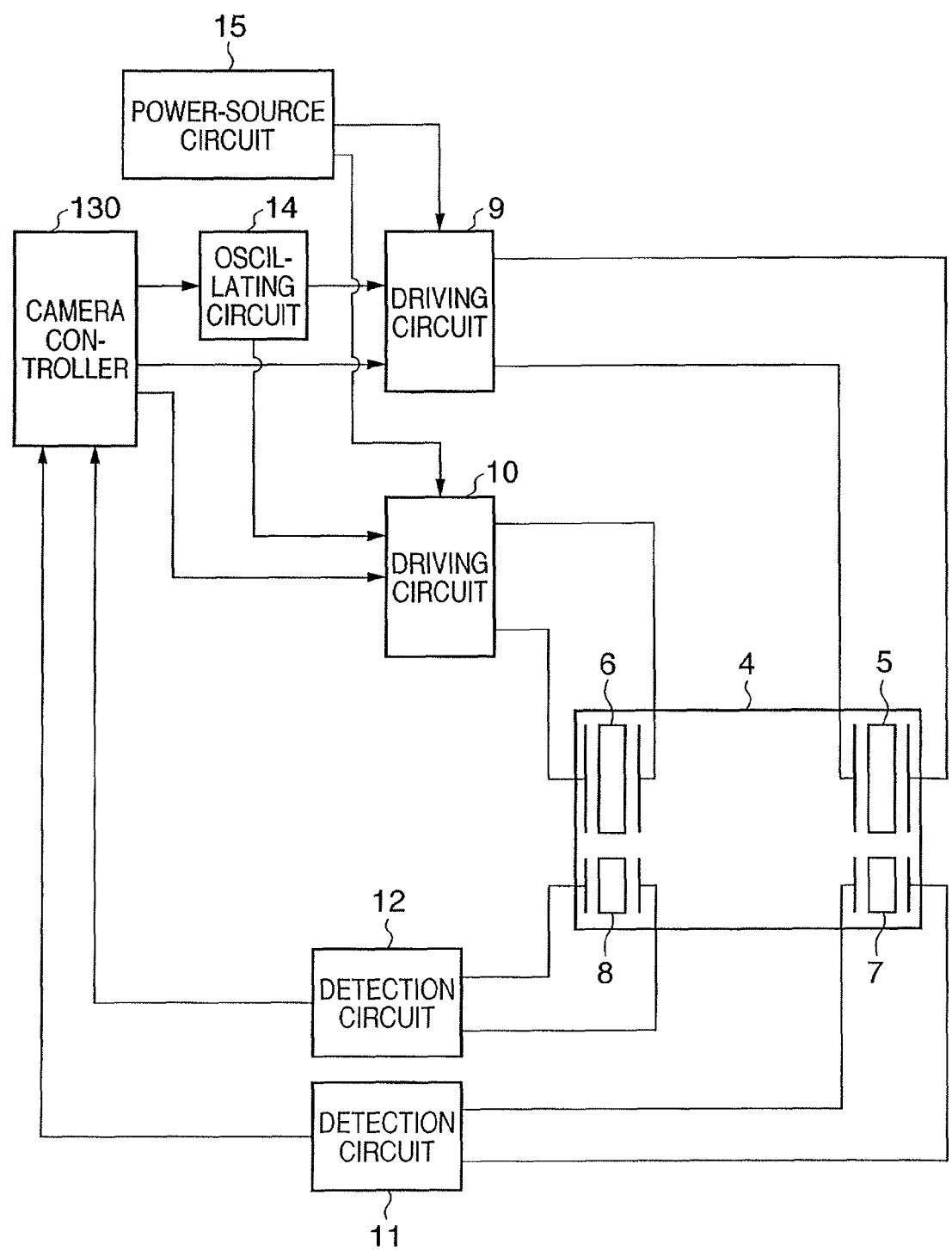
FIG. 5 is a block diagram illustrating the configuration of a control circuit for controlling piezoelectric elements and detecting piezoelectric elements.

FIG. 5 is a block diagram illustrating the configuration of a control circuit for controlling the piezoelectric elements 5, 6 and detecting piezoelectric elements 7, 8. Reference numerals 4, 5, 6, 7, 8, 9, 10, 11 and 12 denote the components already described in conjunction with FIG. 4.

The camera controller 130 controls the overall operation of the digital camera, as shown in FIG. 1, and also controls the vibration of the piezoelectric elements 5, 6. An oscillating circuit 14 is controlled by the camera controller 130 and outputs a high-frequency signal for controlling the piezoelectric elements 5, 6. The oscillating circuit 14 outputs a vibrating signal by changing the oscillation frequency in accordance with a control value from the camera controller 130. A power-source circuit 15 supplies power for driving the piezoelectric elements 5, 6 and is connected to the driving circuits 9, 10.

The overall operation of the drive control circuit illustrated in FIGS. 4 and 5 will now be described.

The camera controller 130 outputs a control signal to instruct the oscillating circuit 14 of the frequency necessary in order to drive the piezoelectric elements 5 and 6. The oscillating circuit 14 outputs a signal having the frequency thus instructed and applies this signal to the driving circuits 9 and 10. The driving circuits 9 and 10 have a function for outputting the power, which is supplied from the power-source circuit 15, in accordance with signals that enter from the camera controller 130 and oscillating circuit 14 by an H-bridge circuit.

Further, the camera controller 130 is capable of individually controlling whether or not outputs are delivered from the driving circuits 9 and 10 by outputting a drive allow/inhibit signal that instructs the driving circuits 9 and 10 as to whether the driving of the piezoelectric elements is allowed or inhibited.

If outputs from the driving circuits 9 and 10 are allowed by the camera controller 130, then driving signals of the frequency designated by the camera controller 130 are applied to the piezoelectric elements 5 and 6 to thereby vibrate the optical member 4 and produce standing waves on the optical member 4. It should be noted that by varying the signal that is sent to the oscillating circuit 14, the camera controller 130 can change the oscillation frequency of the oscillating circuit 14 and thus change the frequency of the signals applied to the piezoelectric elements. By thus changing frequency, the number of loops or nodes of the standing wave on the optical member 4 can be changed and a standing wave having the largest amplitude can be produced.

When the standing wave is produced on the optical member 4, the detecting piezoelectric elements 7 and 8 vibrate and produce signals. The signal produced by the detecting piezoelectric element 7 is converted by the detection circuit 11 to a signal that can be detected by the camera controller 130. The resultant signal is applied to an A/D conversion input of the camera controller 130. Similarly, the signal produced by the detecting piezoelectric element 8 is converted by the detection circuit 12 to a signal that can be detected by the camera controller 130. The resultant signal is applied to an A/D conversion input of the camera controller 130.

As a result, while varying the driving frequency, the camera controller 130 is capable of monitoring the state of the amplitude of the standing wave generated on the optical member 4.

Figure 6A:
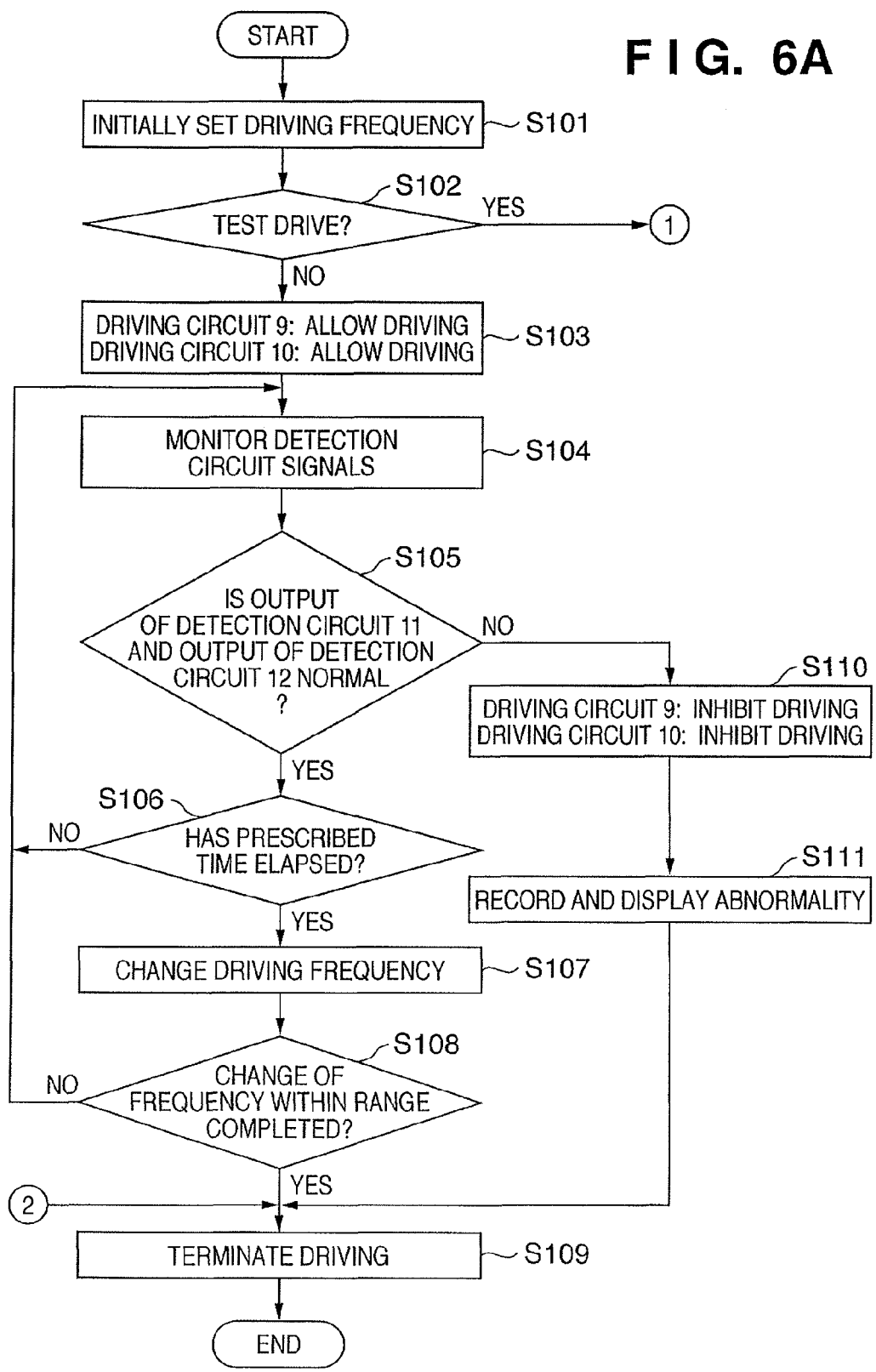
FIGS. 6A and 6B are flowcharts illustrating operation relating to control of vibration of an optical member by a camera controller.
Figure 6B:
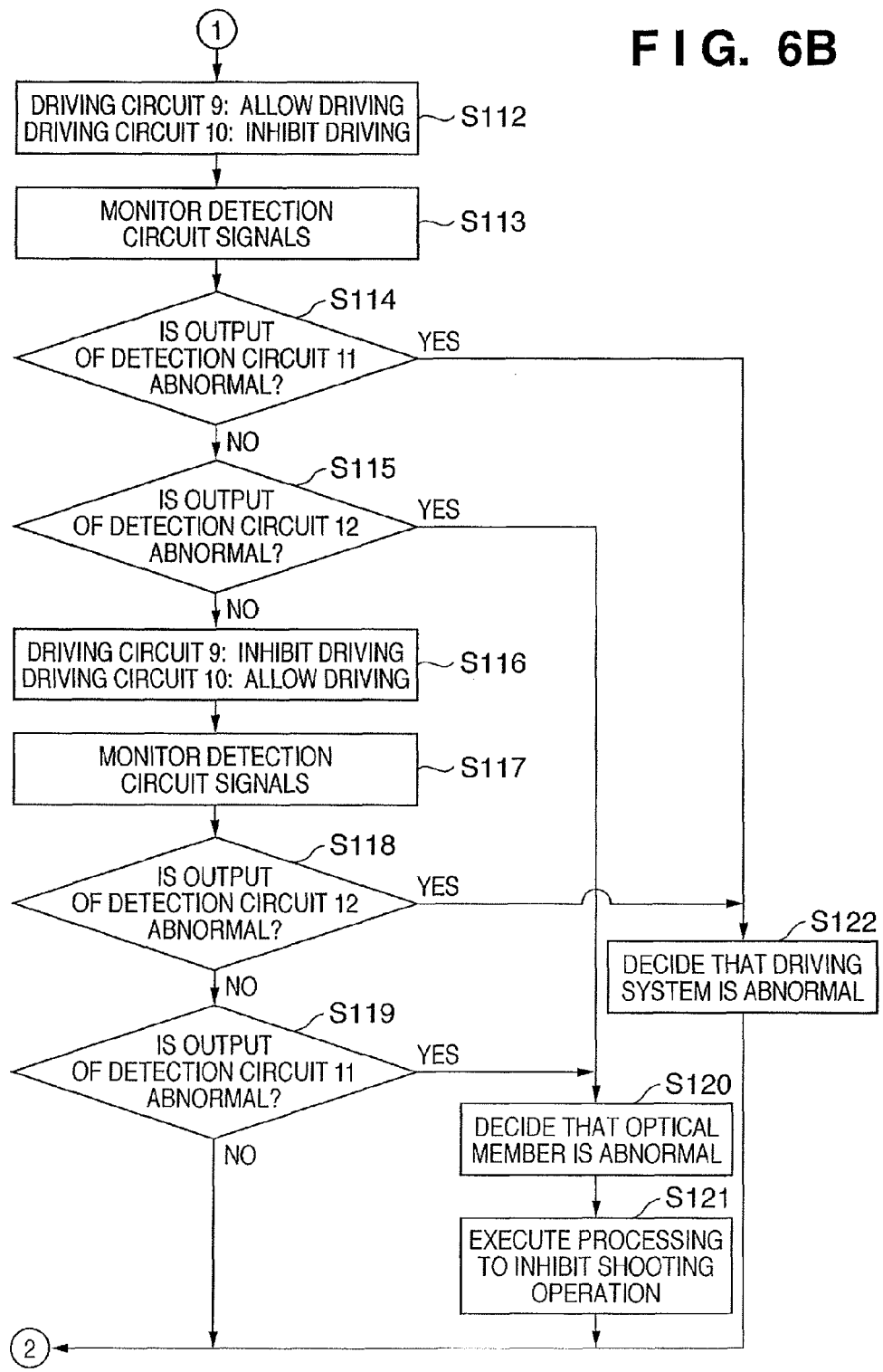

FIGS. 6A and 6B are flowcharts illustrating operation related to control of the vibration of the optical member 4 by the camera controller 130. In FIG. 6A, the camera controller 130 starts operation from step S101, and the operation is either an operation for shaking a foreign substance off the optical member 4 or an operation for conducting a test of the foreign-substance removal system that includes the driving circuits and optical member 4.

At step S101, the oscillating circuit 14 is instructed of the oscillation frequency, whereby the initial setting of frequency for driving the piezoelectric elements 5, 6 is performed. Control then proceeds to step S102.

At step S102, the camera controller 130 determines whether the present driving operation is test driving or driving for removal of a foreign substance. Control proceeds to step S112 if this is test driving or to step S103 if this is driving for removal of a foreign substance.

At step S103, it is necessary to maximize the vibration of the optical member 4 since this is an operation (third control) for driving the optical member 4 to remove a foreign substance. Therefore, in order to drive both of the piezoelectric elements 5 and 6 affixed to the respective ends of the optical member 4, the signal for allowing drive is output to both of the driving circuits 9 and 10, thereby starting the driving of the piezoelectric elements 5 and 6. Control then proceeds to step S104.

At step S104, the vibration of the optical member 4 is detected to monitor the state of vibration. To accomplish this, the signals from the detection circuits 11 and 12 are converted to digital signals by an A/D converter incorporated in the camera controller 130, and these signals are monitored. Control then proceeds to step S105.

At step S105, the camera controller 130 determines whether the output signals from the detection circuit 11 and detection circuit 12 are equal to or greater than respective reference values. If both signals are equal to or greater than the reference values, then the camera controller 130 determines that they are normal and control proceeds to step S106. If even one of the two output signals is less than the reference value, then the camera controller 130 determines that the output signal is abnormal and control proceeds to step S110.

At step S106, the camera controller 130 determines whether a prescribed period of time has elapsed since the start of driving at the set frequency. Control proceeds to step S107 if the prescribed time period has elapsed. Otherwise, control returns to step S104, driving at the same frequency is continued and the detection of the vibratory state is continued as well.

At step S107, the camera controller 130 instructs the oscillating circuit 14 to change the frequency, thereby changing the frequency at which the piezoelectric elements 5 and 6 are driven. Control then proceeds to step S108. When the frequency is changed, the change is to a frequency slightly lower than the set previously.

At step S108, the camera controller 130 determines whether the frequency set at step S107 has exceeded a prescribed range of change in frequency. If the change of frequency within the prescribed range of change in frequency has been completed, control proceeds to step S109. If it has not been completed, then control returns to step S104.

At step S109, the camera controller 130 inhibits driving of the driving circuits 9 and 10 and terminates driving for the purpose of removing the foreign substance.

At step S110, the camera controller 130 places the driving circuits 9 and 10 in the driving-inhibited state since it has been found at step S105 that one or both of the outputs of detection circuits 11 and 12 is abnormal. Control then proceeds to step S111.

At step S111, the camera controller 130 records the abnormal state detected thus far, presents a display indicative of normality on the display unit (not shown) and advances control to step S109 to terminate driving.

The abnormality detected here is one in a case where the piezoelectric elements at both ends of the optical member 4 are driven in order to remove a foreign substance; it is presumed that the abnormality is in the driving circuits, detection circuits, piezoelectric elements or detecting piezoelectric elements, etc.

Next, step S112 is one at which driving for test purposes is carried out. Here one of the piezoelectric elements of the two fixed piezoelectric elements affixed to the ends of the optical member 4 is driven. The camera controller 130 then detects the state of vibration using the detecting piezoelectric elements at both ends and determines whether there is any abnormality. The camera controller 130 therefore sets the driving circuit 9 to allow drive, inhibits the driving of the driving circuit 10 and drives only the piezoelectric element 5. Control then proceeds to step S113.

At step S113, in order to detect vibration of the optical member 4 and monitor its state of vibration, the camera controller 130 converts the signals from the detection circuits 11 and 12 to digital signals by using the A/D converter incorporated in the camera controller 130, and monitors these digital signals. Control then proceeds to step S114.

At step S114, the camera controller 130 determines whether the output signal from the detection circuit 11 is equal to or greater than a reference value. If the signal is equal to or greater than the reference value, then the camera controller 130 determines that the signal is normal and control proceeds to step S115. If the output signal is less than the reference value, then the camera controller 130 determines that the output signal is abnormal and control proceeds to step S122.

At step S115, the camera controller 130 determines whether the output signal from the detection circuit 12 is equal to or greater than a reference value. If the signal is greater equal to or than the reference value, then the camera controller 130 determines that the signal is normal and control proceeds to step S116. If the output signal is less than the reference value, then the camera controller 130 determines that the output signal is abnormal and control proceeds to step S120.

At step S116, the camera controller 130 places the driving circuit 10 in the driving-allowed state and places the driving circuit 9 in the driving-inhibited state in order to drive the piezoelectric element on the side opposite the piezoelectric element driven at step S112. The camera controller 130 then drives only the piezoelectric element 6 and advances control to step S117.

At step S117, the vibration of the optical member 4 is detected to monitor the state of vibration. Accordingly, the signals from the detection circuits 11 and 12 are converted to digital signals by the A/D converter built in the camera controller 130, and these signals are monitored. Control then proceeds to step S118.

At step S118, the camera controller 130 determines whether the output of the detection circuit 12 is equal to or greater than the reference value. If the signal is equal to or greater than the reference value, then the camera controller 130 determines that the signal is normal and advances control to step S119. If the signal is less than the reference value, then the camera controller 130 determines that the output signal is abnormal is advances control to step S122.

At step S119, the camera controller 130 determines whether the output of the detection circuit 11 is equal to or greater than the reference value. If the signal is equal to or greater than the reference value, then the camera controller 130 determines that the signal is normal and advances control to step S109 to terminate driving. If the signal is less than the reference value, then the camera controller 130 determines that the output signal is abnormal and advances control to step S120.

At step S120, the camera controller 130 decides that the optical member 4 is abnormal (first control) because the output from the detecting piezoelectric element attached to the same side as that of the piezoelectric element that was actually driven is normal whereas the output from the detecting piezoelectric element attached to the opposite side of the optical member 4 is abnormal. Control then proceeds to step S121.

Since it has been decided at step S120 that the optical member 4 is abnormal, there is the possibility that the optical member 4 has split and a possibility that a correct image will not be shot. At step S121, therefore, the camera controller 130 executes processing to inhibit a subsequent shooting operation and records the fact of the abnormal state in a memory or the like, not shown. Further, the camera controller 130 causes an external display unit (not shown) to display the fact that the shooting optical system is abnormal and cannot take a picture. Control then proceeds to step S109, where the test driving operation is terminated.

Next, since the output from the detecting piezoelectric element attached to the same side as that of the piezoelectric element that was actually driven is abnormal, it may be construed that there is a high likelihood that the piezoelectric element itself is not vibrating (second control). Consequently, although the operation for removing the foreign substance cannot be performed normally, it is construed that there is no problem in the shooting optical system, unlike the case where control proceeded to step S120. At step S122, therefore, it is decided that it is possible to shoot a picture. Furthermore, the fact that drive for removal of foreign substance is abnormal is recorded in a memory or the like, not shown. Driving for removal of the foreign substance is inhibited at this time. Further, the fact that shooting is possible but not the operation for removing a foreign substance is displayed on the external display unit (not shown). Control then proceeds to step S109 and the driving for test purposes is terminated.

A concrete example of a detection signal used at step S105 will be described with reference to FIG. 10.

Figure 10:
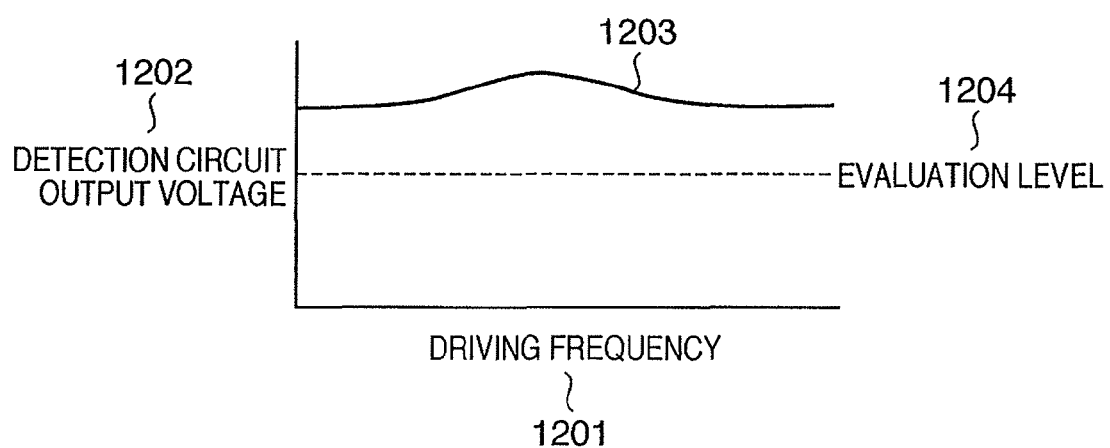
FIG. 10 is a diagram illustrating a change in output voltage of a detection circuit with respect to driving frequency.

As shown in FIG. 10, a horizontal axis 1201 indicates driving frequency, and a vertical axis 1202 indicates the output voltage of the detection circuits 11, 12. A change in the output voltage of the detection circuits 11, 12 with respect to driving frequency is indicated at 1203. The change at 1203 indicates how the output voltage of the detection circuits 11, 12 varies with a change in driving frequency. The waveform changes depending upon the vibratory state of the optical member 4.

The level of the evaluation reference value mentioned at step S105 is indicated at 1204. If the output of the detection circuit 11 or 12 is equal to or greater than this evaluation level, then it is decided that the output is normal. If the output is less than the evaluation level, then it is decided that the output is abnormal.

FIG. 11 indicates a case where an abnormality has developed in the driving circuits 9, 10. FIG. 11 illustrates a state in which the output voltage of the detection circuits 11, 12 it at a level below the evaluation level 1204, as indicated at 1205.

Step S118 is the step at which abnormality of the driving circuit 10 is judged. Abnormality detection can be performed in a manner similar to the case of step S105 (FIGS. 10 and 11) based upon the output voltage of the detection circuit 12.

A concrete example of a detection signal used at step S119 will be described next.

Reference numeral 1206 in FIG. 12 indicates the detection signal from the detection circuit 11 when only the driving circuit 10 is actuated; only the piezoelectric element 6 is driven and the state of vibration of optical member 4 is detected by the detecting piezoelectric element 7 and detection circuit 11. Since the detection signal is a signal indicating the state of vibration of the optical member 4, there are many cases where the output level falls below that of the signal at step S118. Consequently, an evaluation level indicated at 1207 is a value lower than the evaluation level at step S118.

Figure 13:
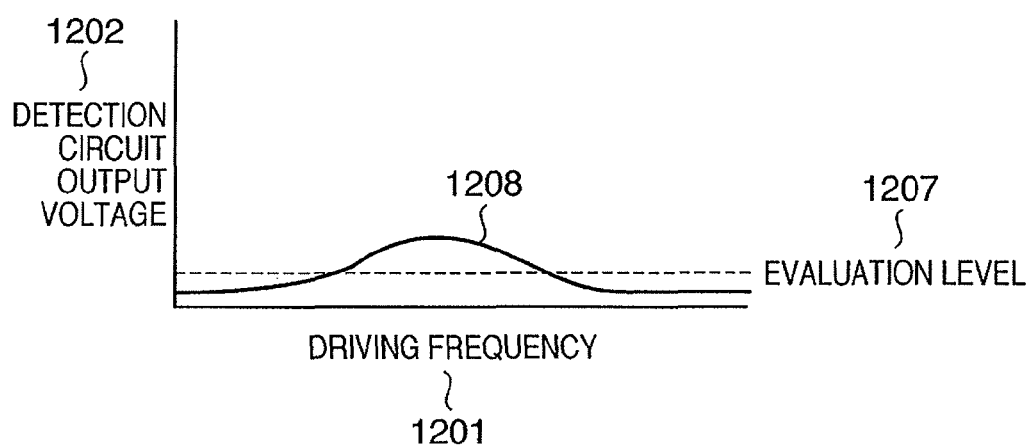
FIG. 13 is a diagram illustrating an example of an abnormal signal.

Reference numeral 1208 in FIG. 13 shows an example of an abnormal signal and indicates a case where the vibration of the optical member 4 is smaller than the prescribed amplitude for some reason. In this case, the detection signal from the detection circuit 11 also has a low value and, hence, abnormality is detected. Further, in a case such as one in which the optical member 4 is damaged, the detection signal will be substantially "0" and, hence, abnormality can be detected.

Thus, in order to detect abnormality in a driving circuit, vibration is detected by a detecting piezoelectric element placed in close proximity to a driving piezoelectric element. Further, in order to detect abnormality of vibration inclusive of that of the optical element, vibration is detected and abnormality judged by a detecting piezoelectric element placed at a position opposing a driving piezoelectric element with the optical element interposed therebetween.

Thus, in the first embodiment, as described above, detecting piezoelectric elements are provided in close proximity to piezoelectric elements placed at respective ones of both ends of an optical member, the piezoelectric element on one side is driven and vibration is detected by the detecting piezoelectric element on the opposite side of the optical member. As a result, the state of vibration of the optical member can be detected and it is possible to detect abnormality of the optical member and abnormality in the driving system of the piezoelectric elements.

Second Embodiment

In the second embodiment, the configuration of the digital camera is the same as that of the first embodiment illustrated in FIGS. 1 and 2 and need not be described again. Further, the arrangement in the vicinity of the image sensor as seen from above is the same as that of the first embodiment shown in FIG. 3 and need not be described again.

Figure 7:
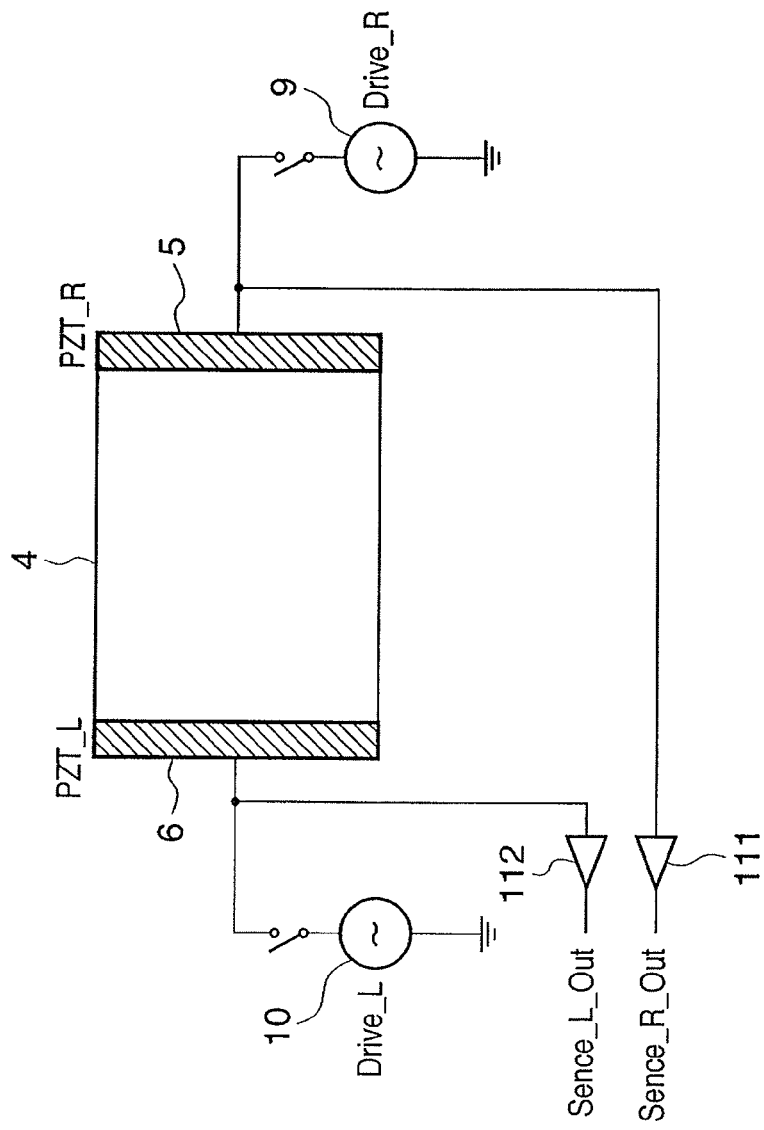
FIG. 7 is a diagram illustrating a portion of an optical member in FIG. 3 as seen from the side of the image sensor, as well as the peripheral circuits of piezoelectric elements, in a second embodiment of the present invention.

FIG. 7 is a diagram illustrating a portion of the optical member 4 in FIG. 3 as seen from the side of the image sensor 2, as well as peripheral circuits of piezoelectric elements (namely circuitry within the piezoelectric-element driving unit 122 shown in FIG. 1). Structural elements in FIG. 7 identical with those of FIG. 4 illustrating the first embodiment are designated by like reference characters.

As shown in FIG. 7, the piezoelectric elements 5 and 6 are affixed to respective ones of both ends of the optical member 4.

Driving circuit 9 is for driving the piezoelectric element 5, and driving circuit 10 is for driving the piezoelectric element 6. A detection circuit (first detection means) 111 is connected to the driving signal of the piezoelectric element 5, detects the driving signal when the piezoelectric element is driven and detects the signal from the piezoelectric element 5 when the piezoelectric element is not driven. A detection circuit (second detection means) 112 is connected to the driving signal of the piezoelectric element 6, detects the driving signal when the piezoelectric element is driven and detects the signal from the piezoelectric element 6 when the piezoelectric element is not driven.

The piezoelectric elements 5 and 6 affixed to both ends of the optical member 4 are vibrated at a prescribed frequency, whereby the optical member 4 is vibrated due to the generation of standing waves and a foreign substance such as dust adhering to the surface of the optical member 4 is shaken off. The detection circuits 111 and 112 monitor the driving signals during the driving of the piezoelectric elements and detect the state of vibration of the optical member 4 during the time that the piezoelectric elements are not being driven.

Figure 8:
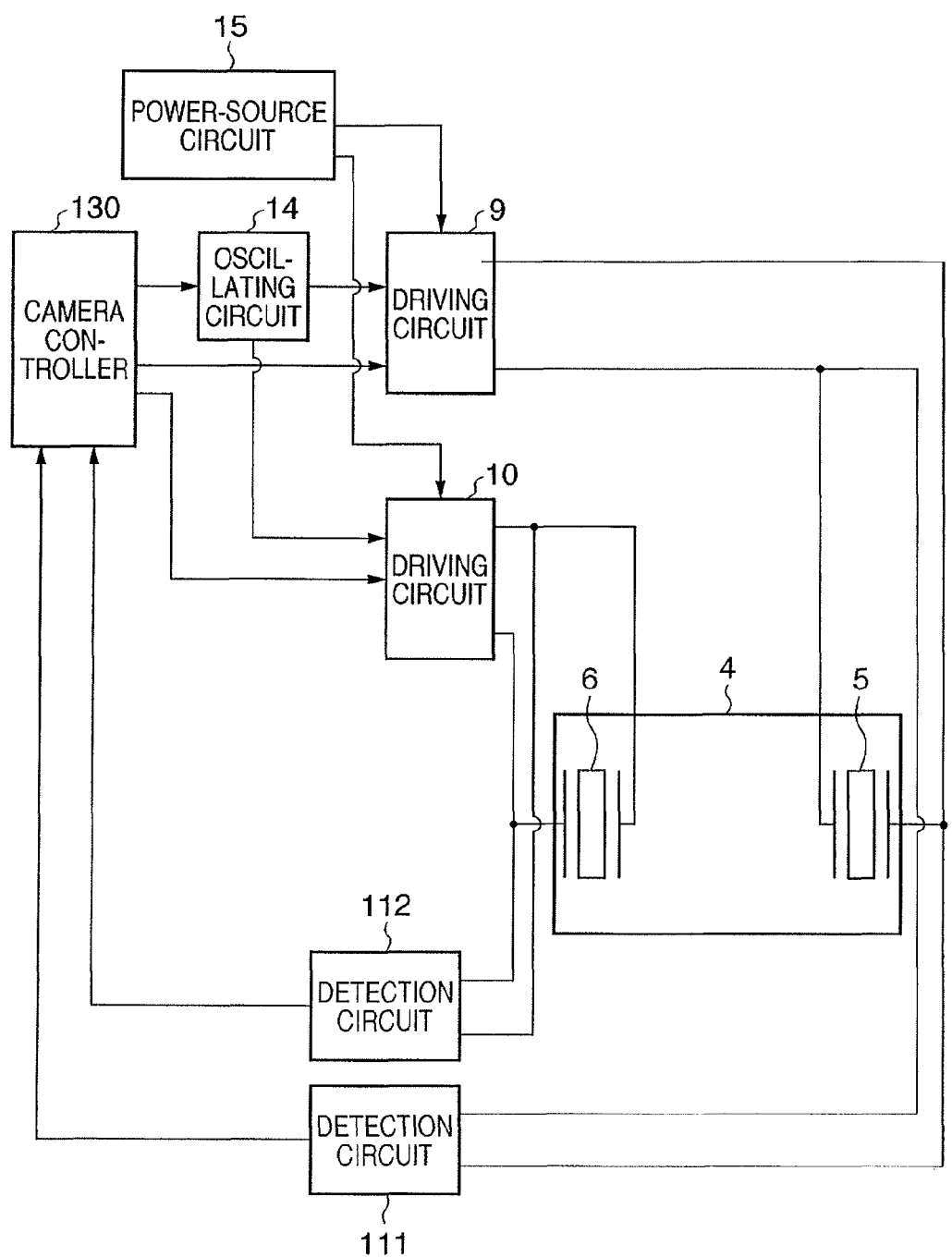
FIG. 8 is a block diagram illustrating the configuration of a control circuit for controlling piezoelectric elements.

FIG. 8 is a block diagram illustrating the configuration of a control circuit for controlling the piezoelectric elements 5, 6. Structural elements in FIG. 8 identical with those in FIG. 5 illustrating the first embodiment are designated by like reference characters.

Camera controller 130 controls the overall operation of the digital camera, as shown in FIG. 1, and also controls the vibration of the piezoelectric elements 5, 6. Oscillating circuit 14 is controlled by the camera controller 130 and outputs a high-frequency signal for controlling the piezoelectric elements 5, 6. The oscillating circuit 14 outputs a vibrating signal by changing the oscillation frequency in accordance with a control value from the camera controller 130. Power-source circuit 15 supplies power for driving the piezoelectric elements 5, 6 and is connected to the driving circuits 9, 10.

The overall operation of the drive control circuit illustrated in FIGS. 7 and 8 will now be described.

The camera controller 130 outputs a control signal to instruct the oscillating circuit 14 of the frequency necessary in order to drive the piezoelectric elements 5 and 6. The oscillating circuit 14 outputs a signal having the frequency thus instructed and applies this signal to the driving circuits 9 and 10. The driving circuits 9 and 10 have a function for outputting the power, which is supplied from the power-source circuit 15, in accordance with signals that enter from the camera controller 130 and oscillating circuit 14 by an H-bridge circuit.

Further, the camera controller 130 is capable of individually controlling whether or not outputs are delivered from the driving circuits 9 and 10 by outputting a drive allow/inhibit signal that instructs the driving circuits 9 and 10 as to whether the driving of the piezoelectric elements is allowed or inhibited.

If outputs from the driving circuits 9 and 10 are allowed by the camera controller 130, then driving signals of the frequency designated by the camera controller 130 are applied to the piezoelectric elements 5 and 6 to thereby vibrate the optical member 4 and produce standing waves on the optical member 4. It should be noted that by varying the signal that is sent to the oscillating circuit 14, the camera controller 130 can change the oscillation frequency of the oscillating circuit 14 and thus change the frequency of the signals applied to the piezoelectric elements. By thus changing frequency, the number of loops or nodes of the standing wave on the optical member 4 can be changed and a standing wave having the largest amplitude can be produced.

When the piezoelectric elements 5 and 6 are driven, the driving signals of the piezoelectric elements 5 and 6 are detected by the detection circuits 111 and 112, these detection signals are converted to digital signals by the A/D converter inside the camera controller 130 and the states of the signals are detected. Further, with regard to the piezoelectric elements affixed to respective ones of both ends of the optical member 4, by driving the piezoelectric element on one side and not driving the piezoelectric element on the other side, the standing waves on the optical member 4 produced by driving the piezoelectric element on the one side are detected by the piezoelectric element on the opposite side.

For example, in a case where the piezoelectric element 5 is driven, the signal produced by the piezoelectric element 6 is converted by the detection circuit 112 to a signal that can be detected by the camera controller 130. The resultant signal is applied to an A/D conversion input of the camera controller 130.

As a result, the camera controller 130 is capable of monitoring the states of the driving circuits 9 and 10 and can also monitor the amplitude of the standing waves produced in the optical member 4 while it varies the driving frequency.

Figure 9A:
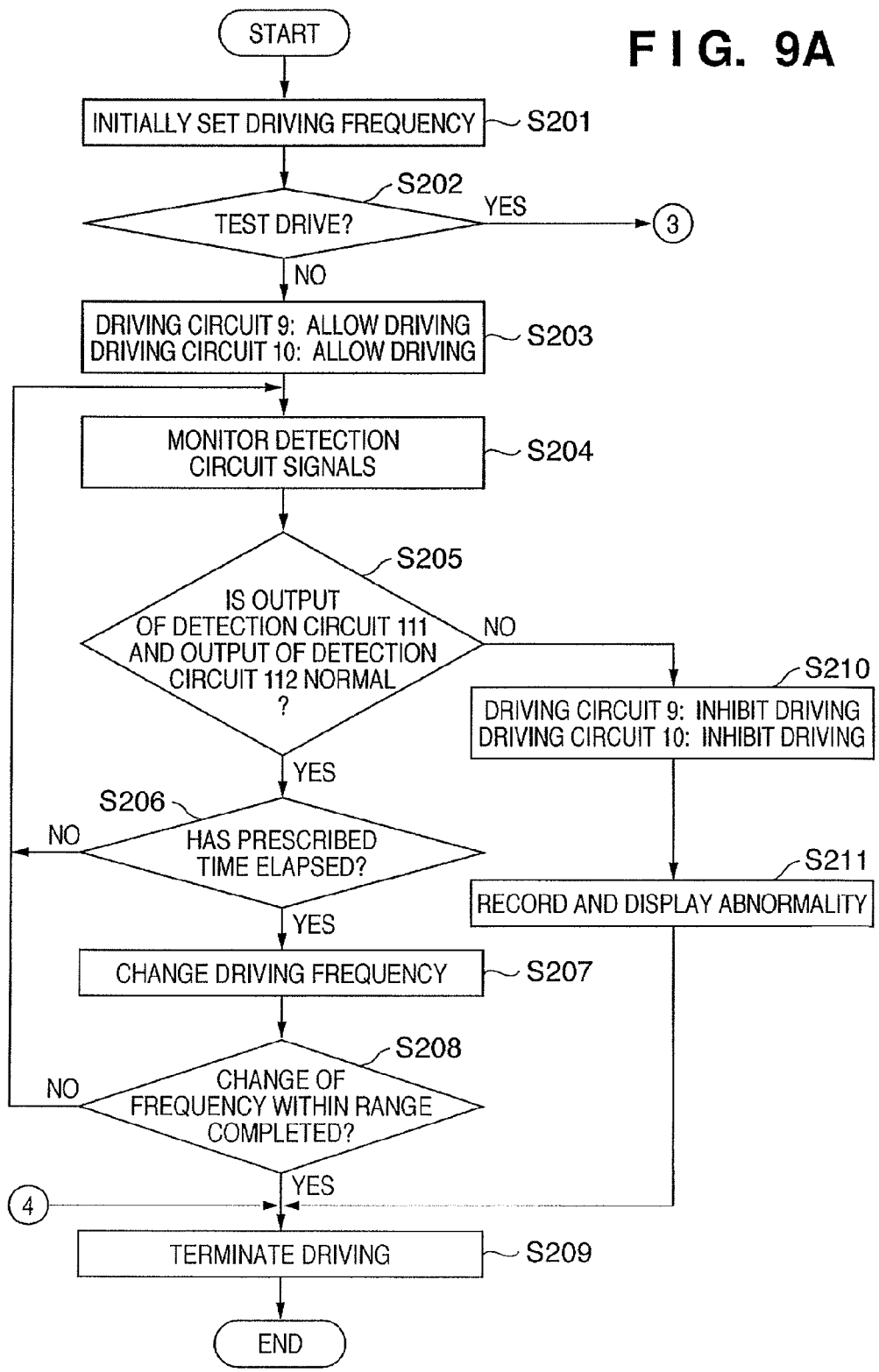
FIGS. 9A and 9B are flowcharts illustrating operation relating to control of vibration of an optical member of a camera controller.
Figure 9B:
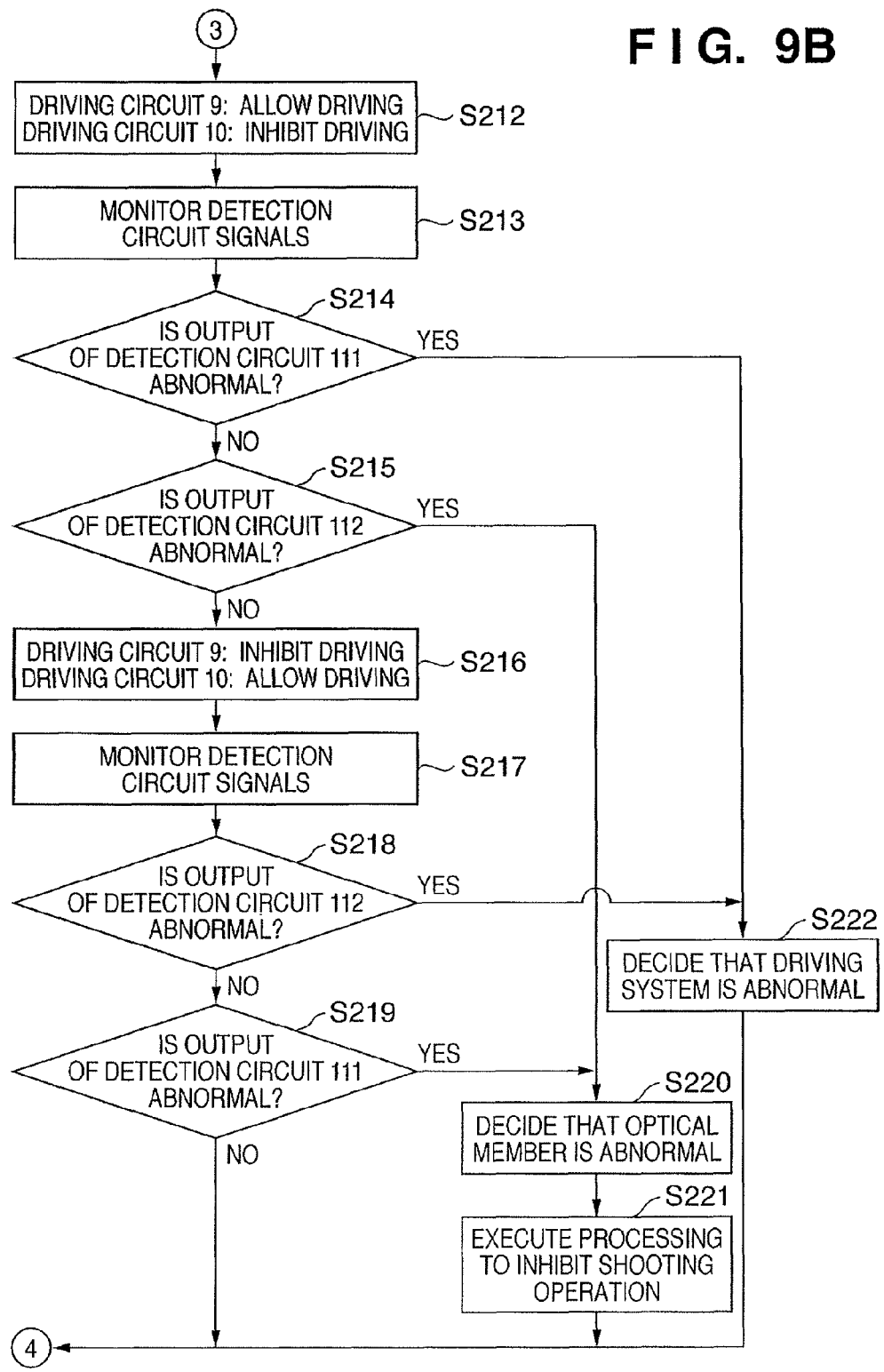

FIGS. 9A and 9B are flowcharts illustrating operation related to control of the vibration of the optical member 4 by the camera controller 130. In FIG. 9A, the camera controller 130 starts operation from step S201, and the operation is either an operation for shaking a foreign substance off the optical member 4 or an operation for conducting a test of the foreign-substance removal system that includes the driving circuits and optical member 4.

At step S201, the oscillating circuit 14 is instructed of the oscillation frequency, whereby the initial setting of frequency for driving the piezoelectric elements 5, 6 is performed. Control then proceeds to step S202.

At step S202, the camera controller 130 determines whether the present driving operation is test driving or driving for removal of a foreign substance. Control proceeds to step S212 if this is test driving or to step S203 if this is driving for removal of a foreign substance.

At step S203, it is necessary to maximize the vibration of the optical member 4 since this is an operation for driving the optical member 4 to remove a foreign substance. Therefore, in order to drive both of the piezoelectric elements 5 and 6 affixed to the respective ends of the optical member 4, the signal for allowing drive is output to both of the driving circuits 9 and 10, thereby starting the driving of the piezoelectric elements 5 and 6. Control then proceeds to step S204.

At step S204, the driving signals of the driving circuits 9 and 10 (the state of vibration of the optical member 4) are monitored. In order to accomplish this, the signals from the detection circuits 111 and 112 are converted to digital signals by the A/D converter inside the camera controller 130, and these signals are monitored. Control then proceeds to step S205.

At step S205, the camera controller 130 determines whether the output signals from the detection circuit 111 and detection circuit 112 are equal to or greater than respective reference values. If both signals are equal to or greater than the reference values, then the camera controller 130 determines that they are normal and control proceeds to step S206. If even one of the two output signals is less than the reference value, then the camera controller 130 determines that the output signal is abnormal and control proceeds to step S210.

At step S206, the camera controller 130 determines whether a prescribed period of time has elapsed since the start of driving at the set frequency. Control proceeds to step S207 if the prescribed time period has elapsed. Otherwise, control returns to step S204, driving at the same frequency is continued and the detection of the vibratory state is continued as well.

At step S207, the camera controller 130 instructs the oscillating circuit 14 to change the frequency, thereby changing the frequency at which the piezoelectric elements 5 and 6 are driven. Control then proceeds to step S208. When the frequency is changed, the change is to a frequency slightly lower than the set previously.

At step S208, the camera controller 130 determines whether the frequency set at step S207 has exceeded a prescribed range of change in frequency. If the change of frequency within the prescribed range of change in frequency has been completed, control proceeds to step S209. If it has not been completed, then control returns to step S204.

At step S209, the camera controller 130 inhibits driving of the driving circuits 9 and 10 and terminates driving for the purpose of removing the foreign substance.

At step S210, the camera controller 130 places the driving circuits 9 and 10 in the driving-inhibited state since it has been found at step S205 that one or both of the outputs of detection circuits 11 and 12 is abnormal. Control then proceeds to step S111.

At step S211, the camera controller 130 records the abnormal state detected thus far, presents a display indicative of normality on the display unit (not shown) and advances control to step S209 to terminate driving.

The abnormality detected here is one in a case where the piezoelectric elements at both ends of the optical member 4 are driven in order to remove a foreign substance; it is presumed that the abnormality is in the driving circuits, detection circuits, piezoelectric elements or detecting piezoelectric elements, etc.

Next, step S212 is one at which driving for test purposes is carried out. Here one of the piezoelectric elements of the two fixed piezoelectric elements affixed to the ends of the optical member 4 is driven. The camera controller 130 then detects the state of vibration using the detecting piezoelectric elements at both ends and determines whether there is any abnormality. The camera controller 130 therefore sets the driving circuit 9 to allow drive, inhibits the driving of the driving circuit 10 and drives only the piezoelectric element 5. Control then proceeds to step S213.

At step S213, in order to monitor the signal that drives the piezoelectric element 5, detect vibration of the optical member 4 by the piezoelectric element 6 and monitor its state of vibration, the signals from the detection circuits 111 and 112 are input to the camera controller 130. These signals, which are input to the A/D converter inside the camera controller 130, are converted to digital signals thereby and the digital signals are monitored by the camera controller 130. Control then proceeds to step S214.

At step S214, the camera controller 130 determines whether the output signal from the detection circuit 111 is equal to or greater than a reference value. If the signal is equal to or greater than the reference value, then the camera controller 130 determines that the signal is normal and control proceeds to step S215. If the output signal is less than the reference value, then the camera controller 130 determines that the output signal is abnormal and control proceeds to step S222.

At step S215, the camera controller 130 determines whether the output signal from the detection circuit 112 is equal to or greater than a reference value. If the signal is equal to or greater than the reference value, then the camera controller 130 determines that the signal is normal and control proceeds to step S216. If the output signal is less than the reference value, then the camera controller 130 determines that the output signal is abnormal and control proceeds to step S220.

At step S216, the camera controller 130 places the driving circuit 10 in the driving-allowed state and places the driving circuit 9 in the driving-inhibited state in order to drive the piezoelectric element on the side opposite the piezoelectric element driven at step S212. The camera controller 130 then drives only the piezoelectric element 6 and advances control to step S217.

At step S217, in order to monitor the signal that drives the piezoelectric element 6, detect vibration of the optical member 4 by the piezoelectric element 5 and monitor its state of vibration, the signals from the detection circuits 111 and 112 are input to the camera controller 130. These signals, which are input to the A/D converter inside the camera controller 130, are converted to digital signals thereby and the digital signals are monitored by the camera controller 130. Control then proceeds to step S218.

At step S218, the camera controller 130 determines whether the output signal from the detection circuit 112 is equal to or greater than a reference value. If the signal is equal to or greater than the reference value, then the camera controller 130 determines that the signal is normal and control proceeds to step S219. If the output signal is less than the reference value, then the camera controller 130 determines that the output signal is abnormal and control proceeds to step S222.

At step S219, the camera controller 130 determines whether the output signal from the detection circuit 111 is equal to or greater than a reference value. If the signal is greater equal to or than the reference value, then the camera controller 130 determines that the signal is normal and advances control to step S209 to terminate driving. If the signal is less than the reference value, then the camera controller 130 determines that the output signal is abnormal and advances control to step S120.

At step S220, the camera controller 130 decides that the optical member 4 is abnormal because the driving signal applied to the piezoelectric element that was actually driven is normal whereas the output from the piezoelectric element attached to the opposite side of the optical member 4 is abnormal. Control then proceeds to step S221.

Since it has been decided at step S220 that the optical member 4 is abnormal, there is the possibility that the optical member 4 has split and a possibility that a correct image will not be shot. At step S221, therefore, the camera controller 130 executes processing to inhibit a subsequent shooting operation and records the fact of the abnormal state in a memory or the like, not shown. Further, the camera controller 130 causes an external display unit (not shown) to display the fact that the shooting optical system is abnormal and cannot take a picture. Control then proceeds to step S209, where the test driving operation is terminated.

Next, since the driving signal applied to piezoelectric element that was actually driven is abnormal, it may be construed that there is an abnormality in the driving circuits, detection circuits or piezoelectric elements, etc. Consequently, although the operation for removing the foreign substance cannot be performed normally, it is construed that there is no problem in the shooting optical system, unlike the case where control proceeded to step S220. At step S222, therefore, it is decided that it is possible to shoot a picture. Furthermore, the fact that drive for removal of foreign substance is abnormal is recorded in a memory or the like, not shown. Driving for removal of the foreign substance is inhibited at this time. Further, the fact that shooting is possible but not the operation for removing a foreign substance is displayed on the external display unit (not shown). Control then proceeds to step S209 and the driving for test purposes is terminated.

A concrete example of a detection signal used at step S205 will be described with reference to FIG. 14.

Figure 14:
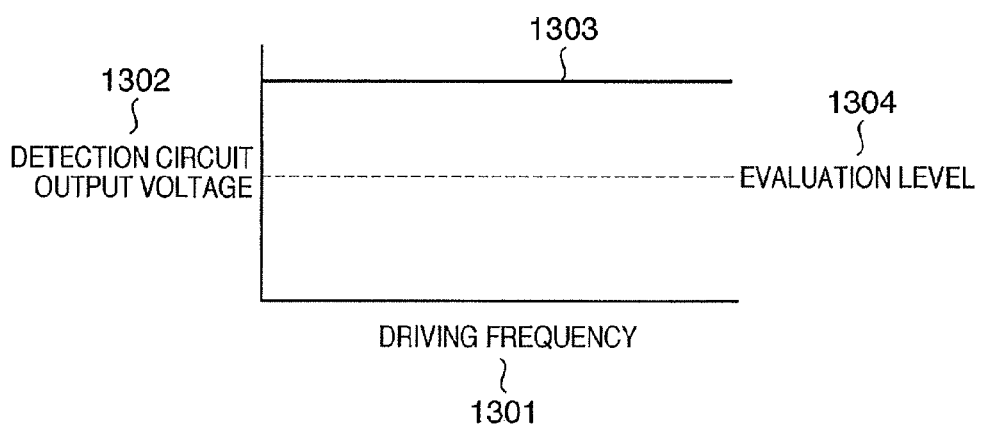
FIG. 14 is a diagram illustrating a change in output voltage of a detection circuit with respect to driving frequency.

As shown in FIG. 14, a horizontal axis 1301 indicates driving frequency, and a vertical axis 1302 indicates the output voltage of the detection circuits 111, 112. A change in the output voltage of the detection circuits 111, 112 with respect to driving frequency is indicated at 1303. The change at 1303 indicates how the output voltage of the detection circuits 111, 112 varies with a change in driving frequency. The waveform changes depending upon the vibratory state of the optical member 4. In a case where the driving signals are being output from the driving circuits 9 and 10, the detection circuits 111 and 112 detect the output signals of the driving circuits 9 and 10, respectively, and therefore output constant voltages irrespective of the driving frequency.

The level of the evaluation reference value mentioned at step S205 is indicated at 1304. If the output of the detection circuit 111 or 112 is equal to or greater than this evaluation level, then it is decided that the output is normal. If the output is less than the evaluation level, then it is decided that the output is abnormal.

Figure 15:
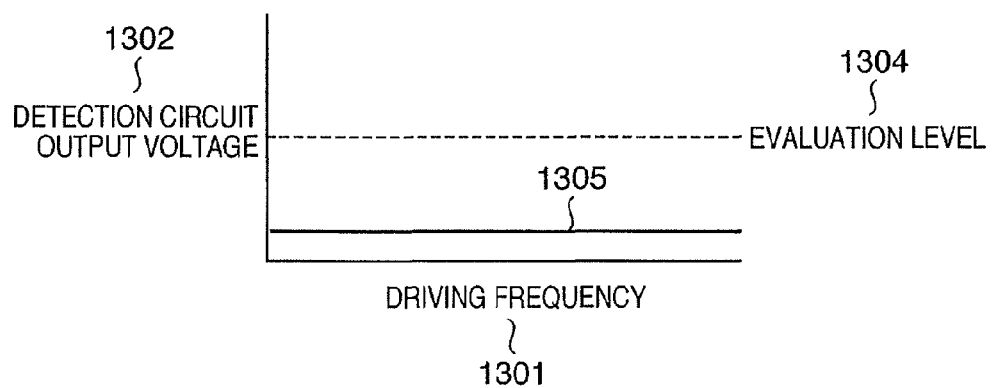
FIG. 15 is a diagram illustrating the output of a detection circuit in a case where a driving circuit has developed an abnormality.

FIG. 15 indicates a case where an abnormality has developed in the driving circuits 9, 10. FIG. 15 illustrates a state in which the output voltage of the detection circuits 111, 112 it at a level below the evaluation level 1304, as indicated at 1305.

Step S218 is the step at which abnormality of the driving circuit 10 is judged. Abnormality detection can be performed in a manner similar to the case of step S205 (FIGS. 14 and 15) based upon the output voltage of the detection circuit 112.

A concrete example of a detection signal used at step S219 will be described next.

Figure 16:
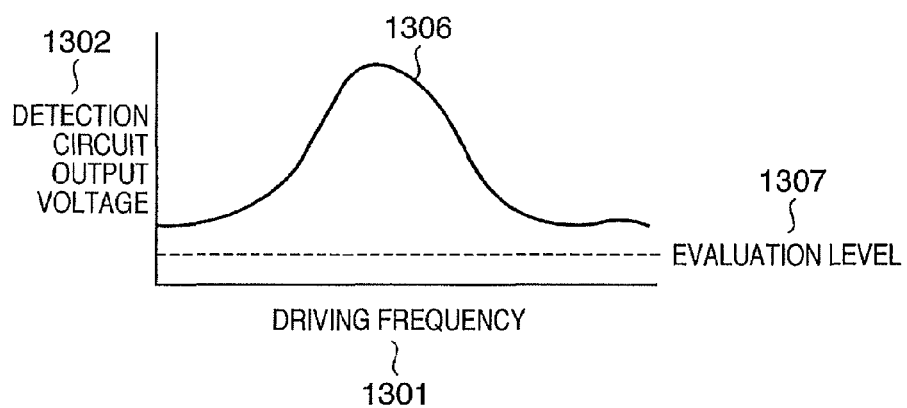
FIG. 16 is a diagram illustrating a detection signal when a driving circuit on one side is actuated and the vibrating state of an optical member is detected by a detecting piezoelectric element and detection circuit on the opposite side.

Reference numeral 1306 in FIG. 16 indicates the detection signal from the detection circuit 111 when only the driving circuit 10 is actuated, only the piezoelectric element 6 is driven and the state of vibration of optical member 4 is detected by the detecting piezoelectric element 5 and detection circuit 111. Since the detection signal is a signal indicating the state of vibration of the optical member 4, there are many cases where the output level falls below that of the signal at step S218. Consequently, an evaluation level indicated at 1307 is a value lower than the evaluation level at step S218.

Reference numeral 1308 in FIG. 17 shows an example of an abnormal signal and indicates a case where the vibration of the optical member 4 is smaller than the prescribed amplitude for some reason. In this case, the detection signal from the detection circuit 111 also has a low value and, hence, abnormality is detected. Further, in a case such as one in which the optical member 4 is damaged, the detection signal will be substantially "0" and, hence, abnormality can be detected.

Thus, in order to detect abnormality in a driving signal, the driving signal is detected. In order to detect abnormality of vibration inclusive of that of the optical element, vibration is detected and abnormality judged by a non-driven piezoelectric element placed at a position opposing a driving piezoelectric element with the optical element interposed therebetween.

Thus, in the second embodiment, as described above, a driving piezoelectric element is used instead of a vibration-detecting piezoelectric element. In other words, of two piezoelectric elements, the piezoelectric element on one side is driven and the piezoelectric element on the side not driven is used for detection. This makes it possible to detect the state of vibration of an optical member without providing a detecting piezoelectric element.

(Structure of Image Capturing Unit)

Figure 18:
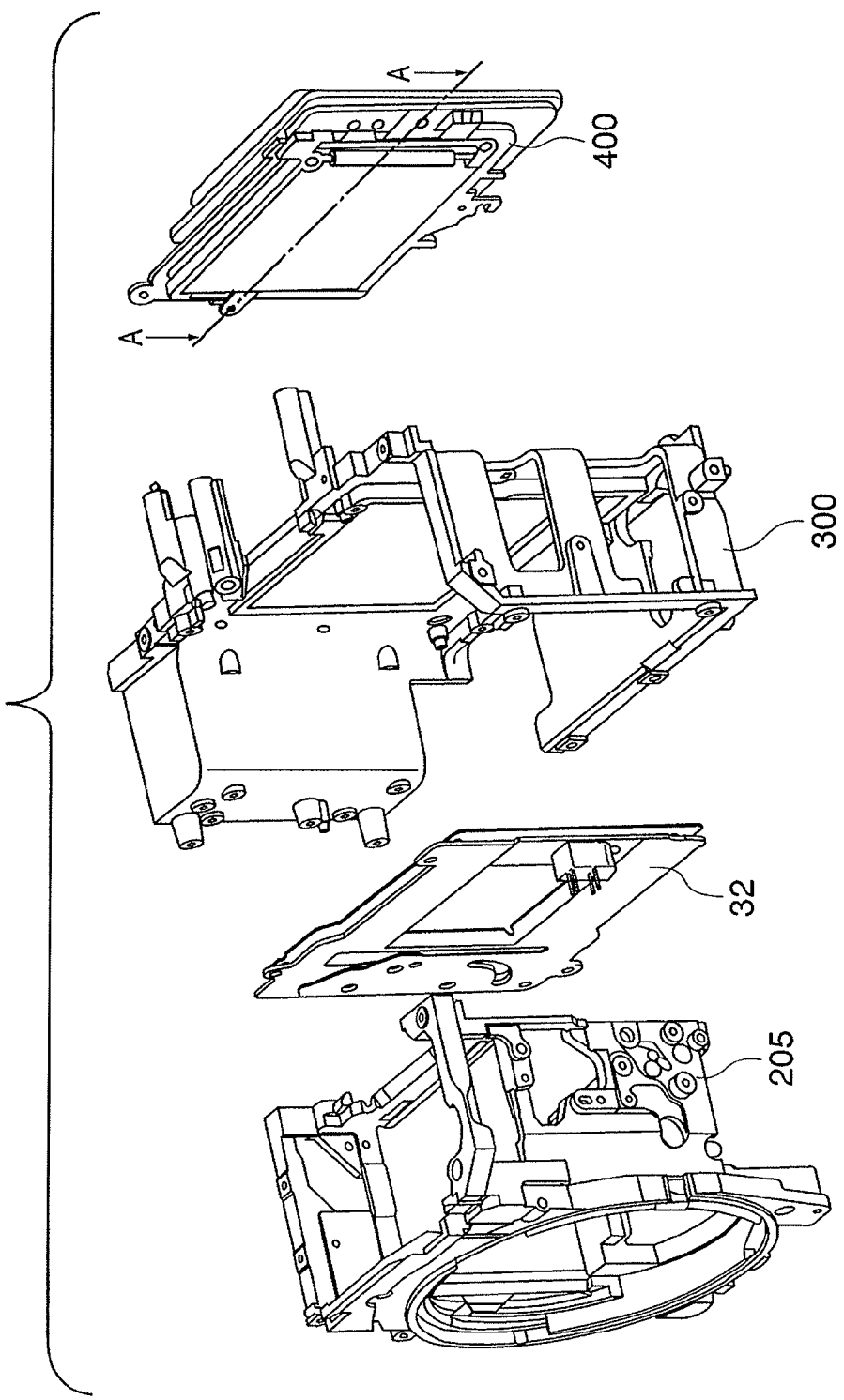
FIG. 18 is an exploded perspective view illustrating schematically the structure within a camera for the purpose of describing the peripheral structure of an image capturing unit.

An image capturing unit 400 will be described with reference to FIGS. 18 to 20. FIG. 18 is an exploded perspective view illustrating schematically the structure within a camera for the purpose of describing the peripheral structure of the image capturing unit 400. The camera has a main-body chassis 300 serving as the frame of the camera main body. Placed in the chassis 300 on the side facing the subject are the mirror box 205 and a shutter unit 32 in the order mentioned starting from the subject side. The image capturing unit 400 is placed on the side of the chassis 300 that faces the photographer. The image capturing unit 400 is secured to the mounting face of the mount portion 202 to which the shooting lens unit is mounted and which serves as a reference and is adjusted in such a manner that the imaging surface of the image sensor 2 will be spaced a prescribed distance away from and lie parallel to the mounting face.

Figure 19:
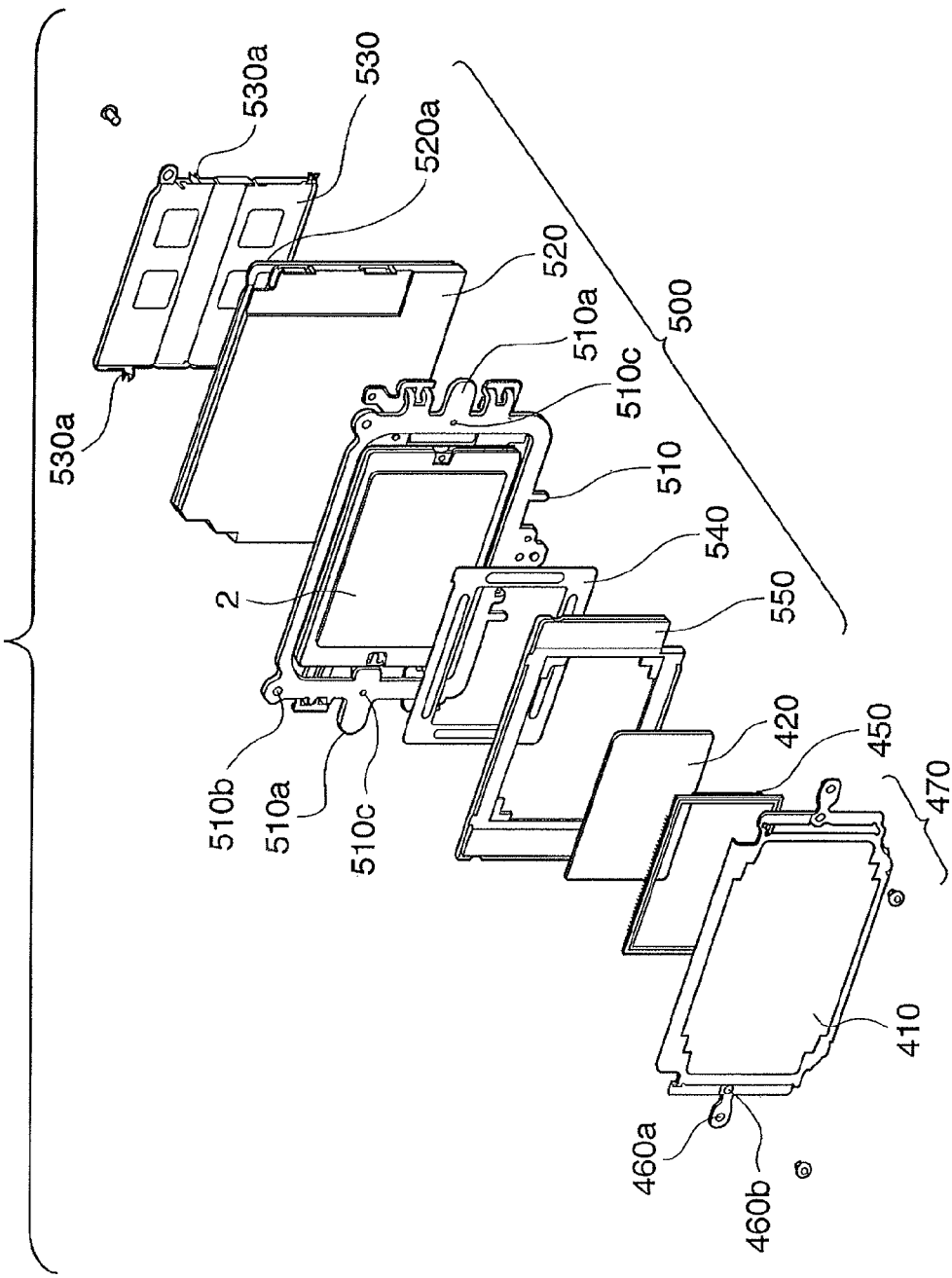
FIG. 19 is an exploded perspective view illustrating the structure of the image capturing unit.

FIG. 19 is an exploded perspective view illustrating the structure of the image capturing unit 400. The image capturing unit 400 generally comprises a vibrating unit 470, a resilient member 450 and an image sensor unit 500. Although the details will be described later, the vibrating unit 470 is secured to the image sensor unit 500 with the resilient member 450 sandwiched therebetween.

The image sensor unit 500 will be described with reference to FIGS. 19 and 20. The image sensor unit 500 includes a fixing member 510 which holds the image sensor 2 and to which a biasing member 460 of the vibrating unit 470 is secured; a circuit board 520 on which the electric circuitry of the imaging system is mounted and which is placed on the side of the fixing member 510 that faces the photographer; a shield case 530 formed by a metal having electrical conductivity; a shielding member 540, which is formed to have an opening corresponding to the effective area of the opto-electronic converting surface of the image sensor 2, placed on the side of the fixing member 510 facing the subject; and an optical low-pass filter holding member 550 for holding an optical low-pass filter 410.

The fixing member 510 has positioning pin portions 510*a* for positioning relative to the biasing member 460 of the vibrating unit 470; screw holes 510*b* for securing the circuit board 520 and shield case 530 by screws; and screw holes 510*c* for securing the biasing member 460 (fixing portions 460*b*) of the vibrating unit 470 by screws.

Figure 20:
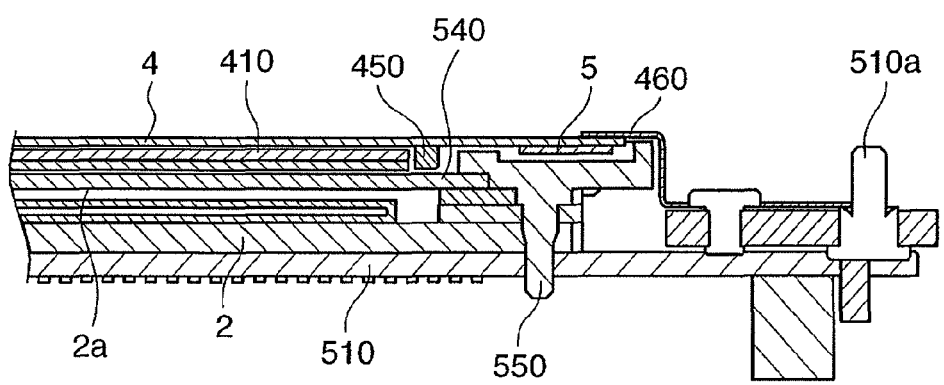
FIG. 20 is a sectional view taken along line A-A of FIG. 18.

FIG. 20 is a sectional view taken along line A-A of FIG. 18. The surface of the shielding member 540 on the side facing the subject abuts against the optical low-pass filter 410, and the surface of the shielding member 540 on the side facing the photographer abuts against a cover glass 2*a* of the image sensor 2. Double-sided tape is affixed to the sides of the shielding member 540 facing the subject and facing the photographer. The optical low-pass filter 410 is fixed to and held on the cover glass 2*a* by the doubled-sided tape on the shielding member 540. As a result, the shielding member 540 is sealed between the optical low-pass filter 410 and the cover glass 2*a* of the image sensor 2 and a sealed space that prevents the intrusion of a foreign substance such as dust is thus formed. The piezoelectric element 5 is secured to the optical member (infrared-blocking filter) 4 on the side facing the image sensor 2, as illustrated.

The circuit board 520 and 530 are provided respectively with escape holes 520*a*, 530*a* for screws. The circuit board 520 and shield case 530 are fixedly engaged with the fixing member 510 by screws using the escape holes 520*a*, 530*a* for screws and the screw holes 510*b*. The shield case 530 is connected to circuit ground potential in order to protect the electric circuit from static electricity, etc.

The optical low-pass filter holding member 550 is secured to the cover glass 2*a* of the image sensor 2 by the doubled-sided tape on the shielding member 540. The optical low-pass filter 410 is positioned at the location of an opening in the optical low-pass filter holding member 550 and is fixed to and held on the shielding member 540 by the double-sided tape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-039830, filed Feb. 20, 2007, and 2007-142330, filed May 29, 2007, which are hereby incorporated by reference herein in their entirety.

What is claimed is:

1. An image capturing apparatus comprising:
an image sensor adapted to opto-electronically convert an image of a subject;
an optical member placed in front of said image sensor;
first and second piezoelectric elements placed at respective ones of both ends of said optical member;
first and second driving units adapted to independently vibrate said first and second piezoelectric elements, respectively;
a first detection unit connected between said first piezoelectric element and said first driving unit and adapted to detect an output signal that is output from said first piezoelectric element owing to vibration of said first piezoelectric element;
a second detection unit connected between said second piezoelectric element and said second driving unit and adapted to detect an output signal that is output from said second piezoelectric element owing to vibration of said second piezoelectric element; and
a control unit adapted to control said first and second driving units, said first detection unit and said second detection unit,
wherein the control unit controls said first and second driving units, said first detection unit and said second detection unit in a first mode so as to vibrate said optical member by vibrating said first piezoelectric element and detect the output signal, which is output from said second piezoelectric element, using said second detection unit, or vibrate said optical member by vibrating said second piezoelectric element and detect the output signal, which is output from said first piezoelectric element, using said first detection unit.

2. The apparatus according to claim 1,
wherein the control unit controls said first and second driving units, said first detection unit and said second detection unit in a second mode so as to vibrate said optical member by vibrating said first piezoelectric element and detect the output signal that is output from said first piezoelectric element using said first detection unit, or vibrate said optical member by vibrating said second piezoelectric element and detect the output signal that is output from said second piezoelectric element using said second detection unit;
wherein operation of said image capturing apparatus in a case where an abnormality has been detected in the first mode is made to differ from operation in a case where an abnormality has been detected in the second mode.

3. The apparatus according to claim 2,
wherein in a case where an abnormality has been detected in the first mode, a shooting operation is inhibited; and in a case where an abnormality has been detected in the second mode but not in the first mode, vibration of said first and second piezoelectric elements for the purpose of removing a foreign substance is inhibited without inhibiting the shooting operation.

4. The apparatus according to claim 1,
wherein the controls said first and second driving units so as to vibrate both said first and second piezoelectric elements in a case where a foreign substance that has attached itself to said optical member is to be removed.

5. An image capturing apparatus comprising:
an image sensor adapted to opto-electronically convert an image of a subject; an optical member placed in front of said image sensor;
first and second piezoelectric elements placed at respective ones of both ends of said optical member;
first and second driving units adapted to independently vibrate said first and second piezoelectric elements, respectively;
a first detection unit connected to said first piezoelectric element and adapted to detect an output signal that is output from said first piezoelectric element owing to vibration of said first piezoelectric element;
a second detection unit connected to said second piezoelectric element and adapted to detect an output signal that is output from said second piezoelectric element owing to vibration of said second piezoelectric element; and
a control unit adapted to control said first and second driving units, said first detection unit and said second detection unit,
wherein the control unit controls said first and second driving units, said first detection unit and said second detection unit in a first mode so as to vibrate said optical member by vibrating said first piezoelectric element and detect the output signal, which is output from said second piezoelectric element, using said second detection unit, or vibrate said optical member by vibrating said second piezoelectric element and detect the output signal, which is output from said first piezoelectric element, using said first detection unit.

6. The apparatus according to claim 5, wherein the control unit controls said first and second driving units, said first detection unit and said second detection unit in a second mode so as to vibrate said optical member by vibrating said first piezoelectric element and detect the output signal that is output from said first piezoelectric element using said first detection unit, or vibrate said optical member by vibrating said second piezoelectric element and detect the output signal that is output from said second piezoelectric element using said second detection unit;
wherein operation of said image capturing apparatus in a case where an abnormality has been detected in the first mode is made to differ from operation in a case where an abnormality has been detected in the second mode.

7. The apparatus according to claim 6, wherein in a case where an abnormality has been detected in the first mode, a shooting operation is inhibited; and in a case where an abnormality has been detected in the second mode but not in the first mode, vibration of said first and second piezoelectric elements for the purpose of removing a foreign substance is inhibited without inhibiting the shooting operation.

8. The apparatus according to claim 5, wherein the controls said first and second driving units so as to vibrate both said first and second piezoelectric elements in a case where a foreign substance that has attached itself to said optical member is to be removed.

* * * * *